US012475593B2

United States Patent
Okada et al.

(10) Patent No.: US 12,475,593 B2
(45) Date of Patent: Nov. 18, 2025

(54) POSITIONING SYSTEM AND MOVING BODY FOR MEASURING POSITION OF MOVING BODY USING IMAGE CAPTURING APPARATUS

(71) Applicant: Panasonic Intellectual Property Management Co., Ltd., Osaka (JP)

(72) Inventors: Tsukasa Okada, Osaka (JP); Ukyou Katsura, Osaka (JP); Tomohide Ishigami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 17/877,008

(22) Filed: Jul. 29, 2022

(65) Prior Publication Data

US 2022/0366599 A1    Nov. 17, 2022

Related U.S. Application Data

(63) Continuation of application No. PCT/JP2020/036114, filed on Sep. 24, 2020.

(30) Foreign Application Priority Data

Feb. 7, 2020    (JP) .................................. 2020-019935

(51) Int. Cl.
  *G06T 7/73*    (2017.01)
  *G01G 19/08*    (2006.01)
  *G06V 20/58*    (2022.01)

(52) U.S. Cl.
  CPC .............. *G06T 7/73* (2017.01); *G01G 19/08* (2013.01); *G06V 20/58* (2022.01);
  (Continued)

(58) Field of Classification Search
  None
  See application file for complete search history.

(56)    References Cited

U.S. PATENT DOCUMENTS

| 6,064,925 A | 5/2000 | Kobayashi et al. |
| 2006/0167595 A1* | 7/2006 | Breed ................. B60R 21/0152 701/1 |

(Continued)

FOREIGN PATENT DOCUMENTS

| JP | 10-69219 | 3/1998 |
| JP | 2011-219229 | 11/2011 |

(Continued)

OTHER PUBLICATIONS

English translation of International Preliminary Report on Patentability issued Aug. 18, 2022 in corresponding International (PCT) Application No. PCT/JP2020/036114.

(Continued)

*Primary Examiner* — Chan S Park
*Assistant Examiner* — Promotto Tajrian Islam
(74) *Attorney, Agent, or Firm* — Wenderoth, Lind & Ponack, L.L.P.

(57)    ABSTRACT

A relative position calculator calculates relative position and attitude of a vehicle based on images captured by an image capturing apparatus on the vehicle. An absolute position calculator extracts a marker from a captured image by, and calculates absolute position and attitude of the vehicle based on position and attitude of the one extracted marker. A reliability calculator calculates reliabilities of the relative position and attitude, and reliabilities of the absolute position and attitude. A position and attitude determiner determines the relative position and attitude as position and attitude of the vehicle when the reliabilities of the relative position and attitude are equal to or larger than the reliabilities of the absolute position and attitude, and otherwise, (Continued)

determines the absolute position and attitude as the position and attitude of the vehicle.

14 Claims, 24 Drawing Sheets

(52) U.S. Cl.
CPC .............. *G06T 2207/30196* (2013.01); *G06T 2207/30204* (2013.01); *G06V 2201/08* (2022.01)

(56) References Cited

U.S. PATENT DOCUMENTS

| | | | | |
|---|---|---|---|---|
| 2016/0238394 | A1* | 8/2016 | Iimura | G06T 7/20 |
| 2019/0066334 | A1* | 2/2019 | Gu | G06T 7/80 |
| 2019/0266753 | A1* | 8/2019 | Dworakowski | G06T 5/70 |
| 2020/0333789 | A1 | 10/2020 | Suzuki et al. | |
| 2021/0318122 | A1 | 10/2021 | Kojima | |

FOREIGN PATENT DOCUMENTS

| | | | | |
|---|---|---|---|---|
| JP | 2017-207942 | | 11/2017 | |
| WO | 2019/130931 | | 7/2019 | |
| WO | 2019/138836 | | 7/2019 | |
| WO | WO-2019182521 | A1 * | 9/2019 | ........... B64C 39/024 |
| WO | 2020/137312 | | 7/2020 | |

OTHER PUBLICATIONS

International Search Report issued Dec. 22, 2020 in International (PCT) Application No. PCT/JP2020/036114.

Mur-Artal, Raúl et al., "ORB-SLAM2: an Open-Source SLAM System for Monocular, Stereo and RGB-D Cameras", IEEE Transactions on Robotics, Oct. 2017, vol. 33, Issue 5.

\* cited by examiner

| ID | POSITION Xw [m] | POSITION Yw [m] | POSITION Zw [m] | ANGLE θ [rad] | SIZE [m] |
|---|---|---|---|---|---|
| 001 | 50 | 5 | 1 | π/2 | 0.30 |
| 002 | 10 | 30 | 1 | 3π/2 | 0.30 |

POSITIONING SYSTEM AND MOVING BODY FOR MEASURING POSITION OF MOVING BODY USING IMAGE CAPTURING APPARATUS

This is a continuation application of International Application No. PCT/JP2020/036114, with an international filing date of Sep. 24, 2020, which claims priority of Japanese patent application No. 2020-019935 filed on Feb. 7, 2020, the content of which is incorporated herein by reference.

BACKGROUND

1. Technical Field

The present disclosure relates to a positioning apparatus for measuring a position of a moving body, such as a vehicle, and a moving body including such a positioning apparatus.

2. Description of Related Art

When moving cargo within a predetermined area or between predetermined points using a cargo transporting vehicle, it may be required to measure and track a position of the vehicle. For example, Japanese Patent Laid-open Publication No. JP 2011-219229 A discloses a cargo location management device for measuring a position of a vehicle using a positioning technology, such as GPS, wireless LAN positioning, and infrared positioning.

When measuring a position of a vehicle moving outdoors, GPS positioning is typically used. On the other hand, radio waves from GPS satellites can not be received indoors, e.g., inside a warehouse and a factory, etc., and therefore, GPS positioning can not be used. Examples of indoor positioning methods include a method using wireless signals of, for example, ultra wide band (UWB), Wi-Fi, or Bluetooth (registered trademark) Low Energy (BLE), etc. However, the positioning method using wireless signals requires that the a large number of wireless transmitters for transmitting wireless signals are disposed in a moving area of the vehicle, thus requiring high initial costs. In addition, there is an indoor positioning method, called Pedestrian Dead Reckoning (PDR). However, it is difficult to accurately measure positions using the PDR.

For example, there is a technology called Visual Simultaneous Localization and Mapping (Visual-SLAM) as disclosed in R. Mur-Artal, et al., "ORB-SLAM2: an Open-Source SLAM System for Monocular, Stereo and RGB-D Cameras", IEEE Transactions on Robotics, Volume: 33, Issue: 5, October 2017, for accurately measuring and tracking a position of a moving body, such as a vehicle, without requiring a large number of wireless transmitters for transmitting wireless signals. According to Visual-SLAM, a moving body provided with an image capturing apparatus moves and captures images around the moving body, and then, an amount of movement of the moving body is calculated based on amounts of movement of feature points in the captured images. Thus, it is possible to estimate a current position of the moving body, and generate a map based on a trajectory of the moving body.

SUMMARY

In a situation where a background varies day by day, such as in a factory and a warehouse, it is difficult to determine a current position using a map created in advance. In this case, a position of a moving body obtained by the Visual-SLAM is calculated as a relative position with respect to a reference position (for example, a start position from which the moving body travels), and therefore, an errors cumulatively increases with a lapse of time. Hence, there is a demand for a positioning apparatus capable of measuring a position of a moving body using an image capturing apparatus, with a smaller error than that of the prior art.

An object of the present disclosure is to provide a positioning apparatus capable of measuring a position of a moving body using an image capturing apparatus, with a smaller error than that of the prior art.

According to an aspect of the present disclosure, a positioning device is provided with: a first calculator, a storage apparatus, a second calculator, a reliability calculator, and a position and attitude determiner. The first calculator is configured to calculate a first position and a first attitude of a moving body indicating a relative position and a relative attitude of the moving body with respect to a reference position and a reference attitude, based on a plurality of images captured by an image capturing apparatus mounted on the moving body. The storage apparatus is configured to store information on identifiers, positions, and attitudes of a plurality of markers disposed at predetermined positions and visually distinguishable from each other, and information on a map containing a passageway for the moving body. The second calculator is configured to extract one of the plurality of markers from an image captured by the image capturing apparatus, and calculate a second position and a second attitude of the moving body indicating a position and an attitude of the moving body in the map, based on a position and an attitude of the one extracted marker. The reliability calculator is configured to calculate first reliability indicating reliabilities of the first position and the first attitude calculated by the first calculator, and a second reliability indicating reliabilities of the second position and the second attitude calculated by the second calculator. The position and attitude determiner is configured to determine the first position and the first attitude as a position and an attitude of the moving body when the first reliability is equal to or larger than the second reliability, and determine the second position and the second attitude as the position and the attitude of the moving body when the first reliability is smaller than the second reliability.

These general and specific aspects may be achieved by a system, a method, a computer program, and any combination of the system, the method, and the computer program.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the one aspect of the present disclosure, it is possible to accurately measure the position and the attitude of the moving body, by calculating reliabilities of the relative position and the relative attitude calculated by the first calculator, and reliabilities of the absolute position and the absolute attitude calculated by the second calculator, and determining more reliable position and attitude as the position and the attitude of the moving body.

DETAILED DESCRIPTION

Embodiments according to the present disclosure will hereinafter be described with reference to the drawings. Note that similar constituent elements in the following respective embodiments are given identical reference signs.

First Embodiment

Hereinafter, a positioning apparatus according to a first embodiment, and a moving body provided with such a positioning apparatus will be described.

Configuration of First Embodiment

[Overall Configuration]

Figure 1:
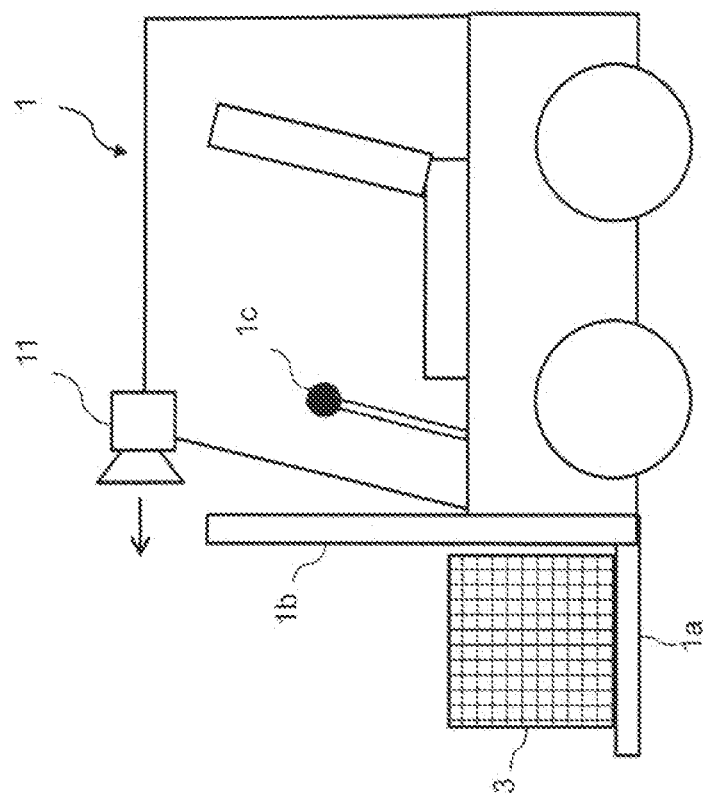
FIG. 1 is a schematic diagram showing a configuration of a vehicle 1 according to a first embodiment.

FIG. 1 is a schematic diagram showing a configuration of a vehicle 1 according to the first embodiment. The vehicle 1 may be, for example, a forklift. In addition, the vehicle 1 is provided with a cargo carrier 1a on which cargo 3 is carried. The vehicle 1 may be further provided with an elevating mechanism 1b for loading and unloading the cargo 3 on the cargo carrier 1a. In addition, the vehicle 1 is provided with a console 1c for receiving user operations, such as forward, backward, steering, and stop. In addition, on a body of the vehicle 1, an image capturing apparatus 11 is mounted for capturing images in a predetermined direction with respect to the vehicle 1 (forward, backward, side, upward, and/or downward directions).

Figure 2:
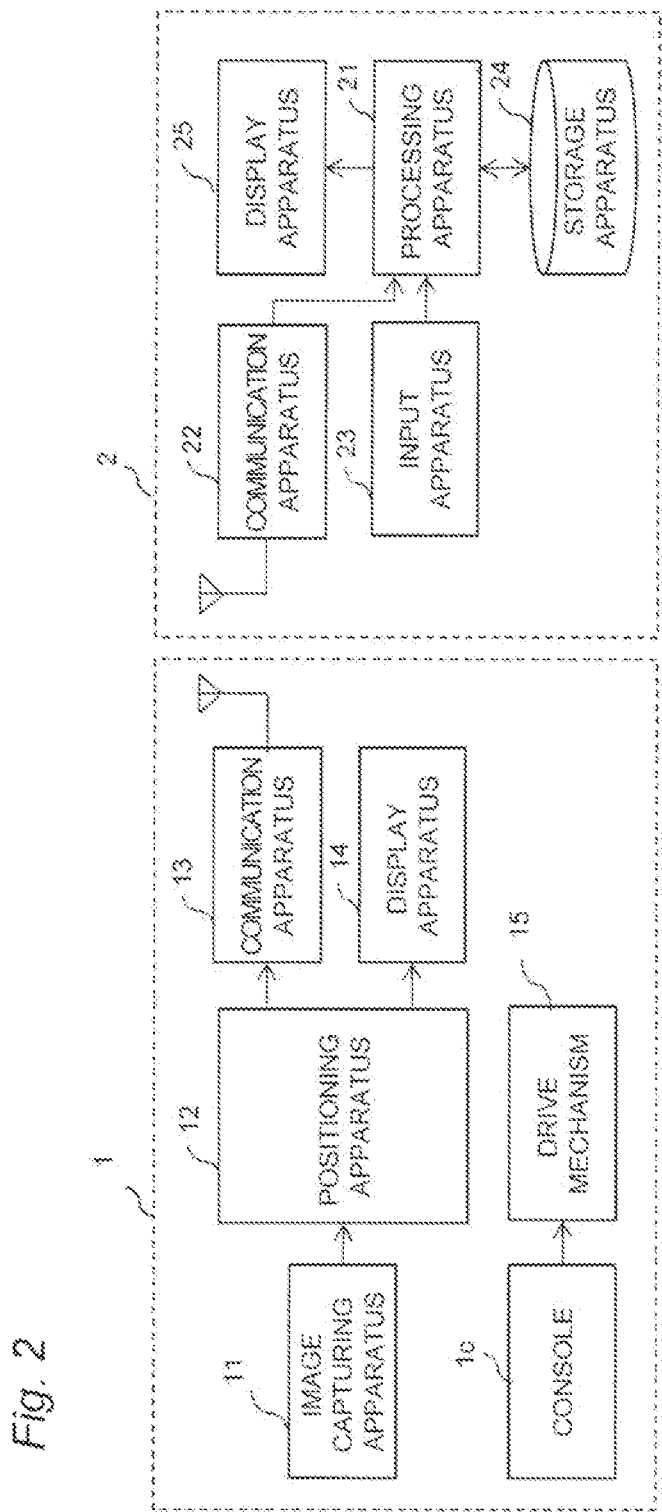
FIG. 2 is a block diagram showing a configuration of a positioning system including the vehicle 1 of FIG. 1.

FIG. 2 is a block diagram showing a configuration of a positioning system including the vehicle 1 of FIG. 1. The positioning system of FIG. 2 includes at least one vehicle 1 and a server apparatus 2. Each vehicle 1 is provided with a positioning apparatus 12 that measures a position of the vehicle 1 based on images captured by the image capturing apparatus 11. The server apparatus 2 obtains positions of the vehicles 1 from the vehicles 1, and records the positions of the vehicles 1.

[Configuration of Vehicle 1]

The vehicle 1 is further provided with the image capturing apparatus 11, the positioning apparatus 12, a communication apparatus 13, a display apparatus 14, and a drive mechanism 15.

The image capturing apparatus 11 generates images of some object in a predetermined direction with respect to the vehicle 1, at certain time intervals, while the vehicle 1 is traveling. For example, the image capturing apparatus 11 includes at least one camera. The image capturing apparatus 11 may capture still images at certain time intervals, or may extract frames from a series of video frames at certain time intervals. The image capturing apparatus 11 sends the captured images to the positioning apparatus 12. The image capturing apparatus 11 provides each image with a timestamp of a time when the image is captured.

The positioning apparatus 12 measures the position and attitude of the vehicle 1 based on the images captured by the image capturing apparatus 11. The positioning apparatus 12 extracts feature points from the images captured by the image capturing apparatus 11, associates the extracted feature points among the images, and calculates a relative position and a relative attitude of the vehicle 1 with respect to a reference position and a reference attitude, based on changes of the feature points among the images. In addition, the positioning apparatus 12 extracts one of a plurality of markers disposed at predetermined positions and visually distinguishable from each other, from an image captured by the image capturing apparatus 11, and calculates an absolute position and an absolute attitude of the vehicle 1 in a map given in advance, based on the one extracted marker. The positioning apparatus 12 further calculates reliabilities of the relative position and the relative attitude calculated by the first calculator, and reliabilities of the absolute position and the absolute attitude calculated by the second calculator, and determines more reliable position and attitude as the position and the attitude of the vehicle 1. For example, the reliability is represented by an estimation error calculated based on the images captured by the image capturing apparatus 11, using a theoretical error model (i.e., statistical error from true values of the position and the attitude) which has been experimentally determined in advance. The smaller the estimation error, the larger the reliability.

In the present specification, the "attitude" of the vehicle 1 indicates, for example, angles of a traveling direction of the vehicle 1 with respect to coordinate axes of a certain coordinate system ("world coordinate system" or "marker coordinate system" described below).

The communication apparatus 13 is provided with modules and control programs of Wi-Fi or Bluetooth, etc., to wirelessly communicate with the server apparatus 2. The communication apparatus 13 transmits the position and the attitude of the vehicle 1 calculated by the positioning apparatus 12, to the server apparatus 2.

The display apparatus 14 may display the position of the vehicle 1 on the map. In addition, the display apparatus 14 may display alarms and the like regarding an operation of the vehicle 1.

The drive mechanism 15 includes an engine or a motor, a steering device, a braking device, and a control device thereof, for the vehicle 1. The drive mechanism 15 is controlled, for example, through the console 1c by a user.

[Configuration of Server Apparatus 2]

The server apparatus 2 of FIG. 2 is provided with a processing apparatus 21, a communication apparatus 22, an input apparatus 23, a storage apparatus 24, and a display apparatus 25. The processing apparatus 21 is, for example, a general-purpose computer including a processor, a memory, and the like. The communication apparatus 22 is communicatively connected to the communication apparatus 13 of the vehicle(s) 1. The input apparatus 23 includes a keyboard, a pointing device, and the like. The storage apparatus 24 records the position and the attitude of the vehicle(s) 1 received from the vehicle(s) 1. The display apparatus 25 displays the position and the attitude of the vehicle(s) 1 received from the vehicle(s) 1. The processing apparatus 21 obtains the position of the vehicle(s) 1 from the vehicle(s) 1 via the communication apparatus 22, records the position of the vehicle(s) 1 in the storage apparatus 24, and displays the position of the vehicle(s) 1 on the display apparatus 25.

The display apparatus 25 displays the position and the attitude of the vehicle 1 calculated by the positioning apparatus 12 of the vehicle 1. The processing apparatus 21 may obtain in advance a map of a movable range of the vehicle 1 (such as a warehouse or a factory), and display the position and the attitude of the vehicle 1 calculated by the positioning apparatus 12, on the display apparatus 25, such that the position and the attitude are overlaid on this map. Alternatively, the processing apparatus 21 itself may generate a map based on a travelling path of the vehicle 1, and display this map on the display apparatus 25.

[Configuration of Positioning Apparatus 12]

Figure 3:
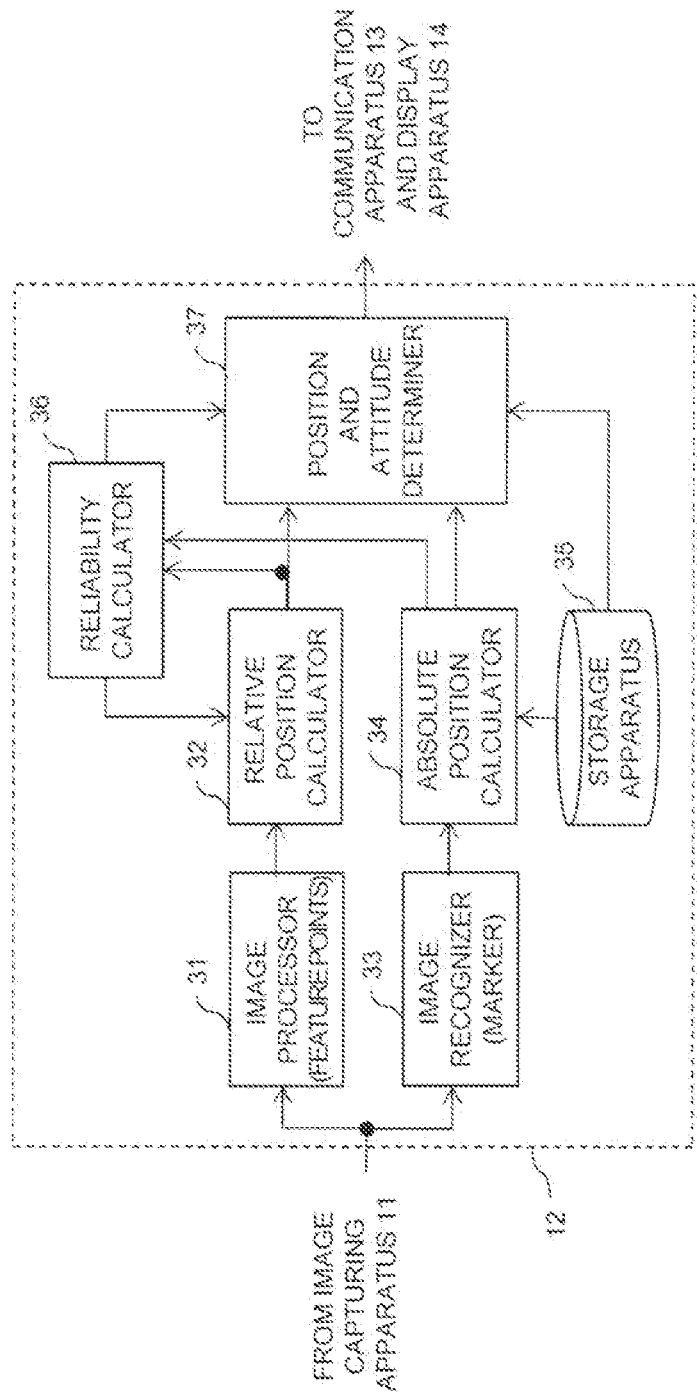
FIG. 3 is a block diagram showing a configuration of a positioning apparatus 12 of FIG. 2.

FIG. 3 is a block diagram showing a configuration of the positioning apparatus 12 of FIG. 2. The positioning apparatus 12 is provided with an image processor 31, a relative position calculator 32, an image recognizer 33, an absolute position calculator 34, a storage apparatus 35, a reliability calculator 36, and a position and attitude determiner 37.

The storage apparatus 35 stores information on identifiers, positions, and attitudes of a plurality of markers 4 disposed at predetermined positions and visually distinguishable from each other, and information on a map including passageways for the vehicle 1 (for example, a map of a warehouse 100 described with reference to FIG. 4). The positions of the markers 4 may be represented as relative positions with respect to a reference position, and/or may be represented in association with the map.

Figure 4:
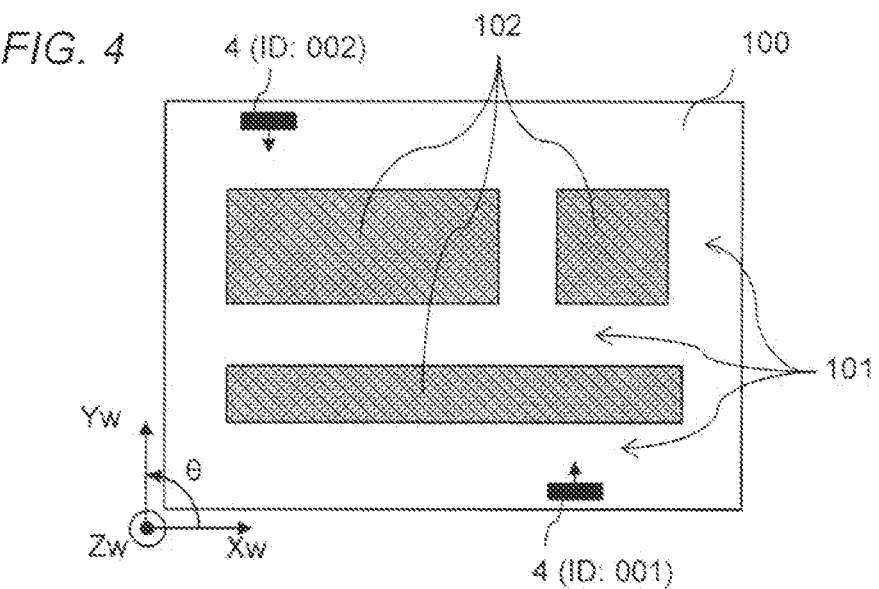
FIG. 4 is a map of a warehouse 100 including passageways 101 through which the vehicle 1 of FIG. 1 travels.

FIG. 4 is a map of a warehouse 100 including passageways 101 through which the vehicle 1 of FIG. 1 travels. The warehouse 100 includes structures, such as a plurality of the passageways 101, and a plurality of shelves 102. The plurality of markers 4 are disposed in advance at a plurality of predetermined positions in the warehouse 100. The vehicle 1 of FIG. 1 travels through the passageways 101 to transport the cargo 3 from one of the shelves 102 to another one of the shelves 102. The positions of the vehicle 1 and the markers 4 are represented using a world coordinate system (Xw, Yw, Zw) determined for the entire warehouse 100.

Figure 5:
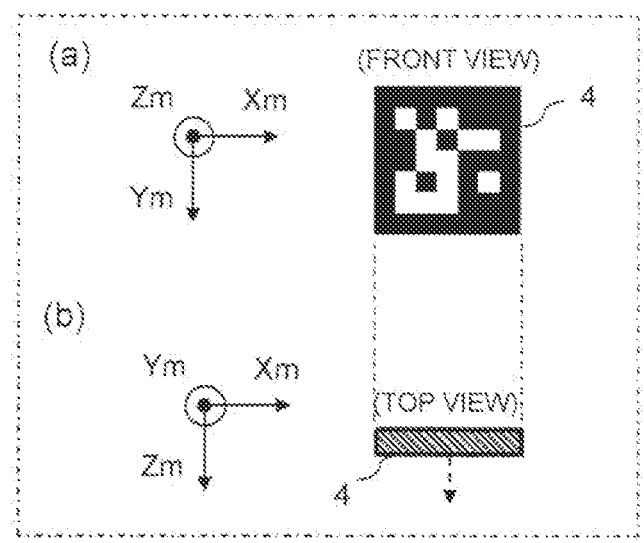
FIG. 5 is a diagram showing an example of a marker 4 of FIG. 4; (a) shows a front view of the marker 4, and (b) shows a top view of the marker 4.

FIG. 5 is a diagram showing an example of the marker 4 of FIG. 4; FIG. 5(a) shows a front view of the marker 4, and FIG. 5(b) shows a top view of the marker 4. In the example of FIG. 5, the marker 4 is configured as a square flat plate. On one side of the marker 4, the marker 4 has a visually distinguishable pattern, into which an identifier of the marker 4 itself is encoded. In the example of FIG. 5, the marker 4 has a pattern constituted of 7×7 white or black square cells in the longitudinal and lateral directions. The pattern of the marker 4 is further configured such that the attitude of the marker 4 itself can be detected from a captured image of the marker 4, such as a marker used in a field of augmented reality (also referred to as a "AR marker"). Each marker 4 has a marker coordinate system (Xm, Ym, Zm) whose origin is located at an arbitrary point of the marker 4 (for example, center, or one vertex). In the lower part of FIG. 5 and other figures, a front surface of the marker 4 (positive direction of Zm axis) is indicated by an arrow at the center of a surface along an Xm-Ym plane.

Figures 6, 7:
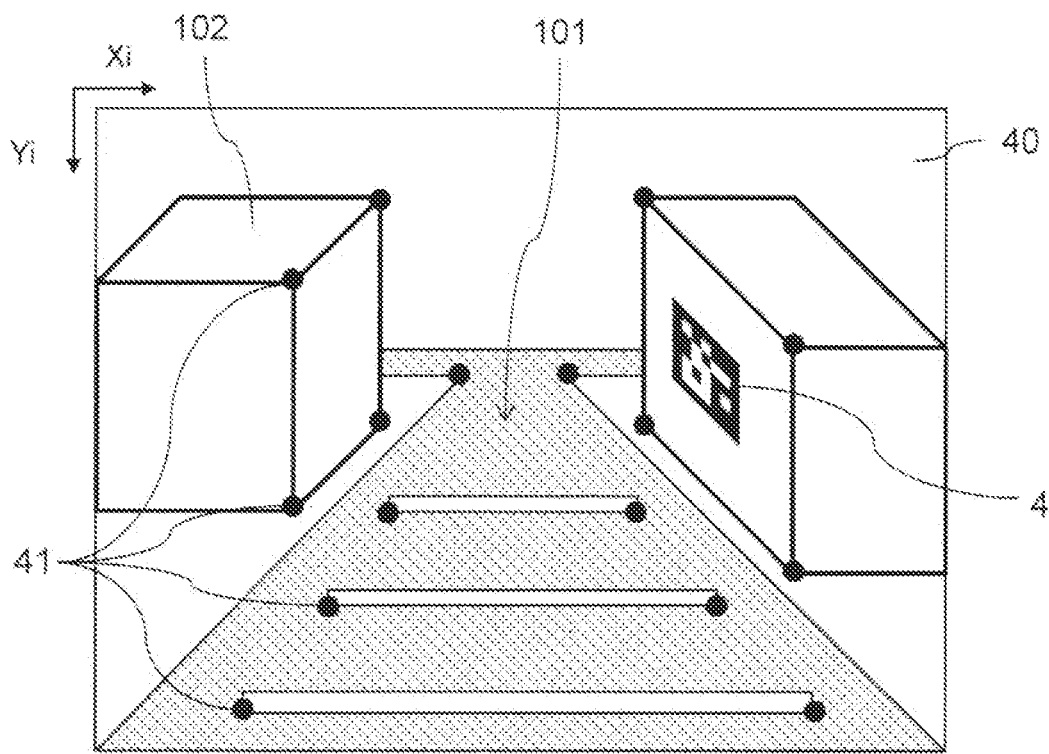
FIG. 6 is a table showing an example of marker information stored in a storage apparatus 35 of FIG. 3.
FIG. 7 is a diagram showing an example of an image 40 captured by an image capturing apparatus 11 of FIG. 1.

FIG. 6 is a table showing an example of marker information stored in the storage apparatus 35 of FIG. 3. The example of FIG. 6 indicates information on the two markers 4 shown in FIG. 4. The markers 4 have identifiers 001 and 002, respectively. Each of the identifiers is encoded into the pattern of the corresponding marker 4. In addition, each of the markers 4 has certain coordinates in the world coordinate system (Xw, Yw, Zw). In addition, each of the markers 4 is disposed in such an attitude that the front surface (positive direction of Zm axis) of the marker 4 has an angle θ with respect to the Xw axis in an Xw-Yw plane (that is, azimuth angle). The attitude of each of the markers 4 may be represented by an azimuth angle and an elevation angle. In addition, each of the markers 4 has a square pattern, and has an actual size of 30 cm×30 cm. The size of the markers 4 indicates a size of the pattern area, and does not include margins and the like (not shown in FIG. 5) around the pattern.

The storage apparatus 35 stores marker information for all the markers 4, for example, including items shown in FIG. 6. In addition, the storage apparatus 35 also stores map information including directions, sizes, and arrangements of all the passageways 101.

FIG. 7 is a diagram showing an example of an image 40 captured by the image capturing apparatus 11 of FIG. 1. The image 40 includes a plurality of feature points 41. Each of the feature points 41 is a point whose luminance or color is distinguishable from those of surrounding pixels, and whose position can be accurately determined. For example, the feature points 41 are detected from vertices or edges of structures, such as the passageways 101 or the shelves 102 through which the vehicle 1 travels, and detected from patterns on a floor, walls, or a ceiling. In addition, when the vehicle 1 passes near any one of the markers 4, the image 40 includes the corresponding marker 4. The positions of the feature points 41 and the marker 4 in the image 40 are represented by, for example, an image coordinate system (Xi, Yi) whose origin is located at any point in the image 40 (for example, upper left corner).

Again referring to FIG. 3, the image processor 31 extracts (tracks) coordinates of the feature points corresponding to each other, from a plurality of images captured by the image capturing apparatus 11 at a plurality of time moments separated by a certain time length from each other. The relative position calculator 32 calculates an amount of movement of the vehicle 1 based on amounts of movement of the feature points in two images temporary adjacent to each other. Thus, the relative position calculator 32 calculates a relative position and a relative attitude of the vehicle 1 with respect to a reference position and a reference attitude (for example, a position and an attitude from which the vehicle 1 starts to travel), based on the coordinates of the feature points of the plurality of images. The relative position calculator 32 may calculate the relative position and the relative attitude of the vehicle 1 using known techniques for image processing and positioning, such as Visual-SLAM or Visual-Odometry. The reference position and the reference attitude are associated with the map information stored in the storage apparatus 35. In addition, the relative position calculator 32 provides the relative position and the relative attitude with a timestamp of the image associated with calculation of the relative position and the relative attitude (the latter of two images temporary adjacent to each other).

The relative position calculator 32 may represent the calculated position of the vehicle 1, for example, using Cartesian coordinates (XYZ coordinates). The relative position calculator 32 may calculate a velocity and/or an acceleration of the vehicle 1, based on the calculated position of the vehicle 1, and time. The relative position calculator 32 may represent the calculated attitude of the vehicle 1 as roll (left and right inclination), pitch (front and rear inclination), and yaw (rotation around an axis perpendicular to a floor surface (that is, the Zw axis in FIG. 4)). Thus, it is possible to represent not only a direction of the vehicle 1 in a horizontal plane parallel to the ground, but also an inclination of the body of the vehicle 1, and movement of the vehicle 1 in elevation.

In the present specification, the image processor 31 and the relative position calculator 32 are collectively referred to as a "first calculator". In addition, in the present specification, the relative position and relative attitude are referred to as a "first position" and a "first attitude", respectively.

The image recognizer 33 extracts one of the plurality of markers 4 disposed at predetermined positions and visually distinguishable from each other, from an image captured by the image capturing apparatus 11. The absolute position calculator 34 calculates the absolute position and the absolute attitude of the vehicle 1 indicating the position and the attitude of the vehicle 1 in the map (i.e., world coordinate system), by referring to the information on the markers 4 and the map information, both stored in the storage apparatus 35, based on the position and the attitude of the one extracted marker 4. In addition, the absolute position calculator 34 provides the absolute position and the absolute attitude with a timestamp of the image associated with calculation of the absolute position and the absolute attitude.

In the present specification, the image recognizer 33 and the absolute position calculator 34 are collectively referred to as a "second calculator". In addition, in the present specification, the absolute position and absolute attitude are referred to as a "second position" and a "second attitude", respectively.

The reliability calculator 36 calculates the reliabilities of the relative position and the relative attitude calculated by the relative position calculator 32, and the reliabilities of the absolute position and the absolute attitude calculated by the absolute position calculator 34. The reliability calculator 36 calculates the reliabilities of the relative position and the relative attitude, for example, such that the reliabilities increase as the moving distance and the rotation angle from the reference position and the reference attitude of the vehicle 1 decrease, and such that the reliabilities decrease as the moving distance and the rotation angle increase. For example, when the position and attitude determiner 37 determines the absolute position and the absolute attitude as the position and the attitude of the vehicle 1 as described later, the reference position and the reference attitude of the vehicle 1 are reset. In other words, the absolute position and the absolute attitude, obtained when the reliabilities of the absolute position and the absolute attitude exceed the reliabilities of the relative position and the relative attitude, are set as the reference position and the reference attitude of the vehicle 1. In addition, the reliability calculator 36 calculates the reliabilities of the absolute position and the absolute attitude, for example, such that the reliabilities increases as an apparent size of the marker 4 in the image captured by the image capturing apparatus 11 increases, and such that the reliabilities decreases as the apparent size of the marker 4 in the image decreases.

The position and attitude determiner 37 determines the relative position and the relative attitude as the position and the attitude of the vehicle 1, when the reliabilities of the relative position and the relative attitude are equal to or larger than the reliabilities of the absolute position and the absolute attitude. In addition, the position and attitude determiner 37 determines the absolute position and the absolute attitude as the position and the attitude of the vehicle 1, when the reliabilities of the relative position and the relative attitude are smaller than the reliabilities of the absolute position and the absolute attitude. The position and attitude determiner 37 synchronizes the absolute position and the absolute attitude with the relative position and the relative attitude, based on the timestamp of the relative position and the relative attitude, and the timestamp of the absolute position and the absolute attitude. The position and attitude determiner 37 may consider the relative position and the relative attitude, and the absolute position and the absolute attitude, as positions and attitudes calculated from the same image, for example, when they have a time difference smaller than a predetermined threshold, and have timestamps closest to each other.

At least some of the components 31 to 37 of the positioning apparatus 12 may be integrated to each other. For example, the image processor 31 and the image recognizer 33 may be integrated to each other. In addition, the components 31 to 37 of the positioning apparatus 12 may be implemented as dedicated circuits, or as programs executed by a general-purpose processor.

Operation of First Embodiment

According to the positioning device 12, when the errors of the relative position and the relative attitude calculated using Visual-SLAM increases, it is possible to correct the position and the attitude of the vehicle 1 using the absolute position and the absolute attitude calculated based on the marker 4.

However, when calculating the relative position and the relative attitude of the vehicle 1 using Visual-SLAM, the errors of the relative position and the relative attitude increase as the moving distance and the rotation angle of the vehicle 1 from the reference position and the reference attitude increase. In addition, when calculating the absolute position and the absolute attitude of the vehicle 1 based on the marker 4, the errors of the absolute position and the absolute attitude increase depending on conditions for capturing the marker 4 by the image capturing apparatus 11. For example, the errors of the absolute position and the absolute attitude increase as the distance from the image capturing apparatus 11 to the marker 4 increases. In addition, the errors of the absolute position and the absolute attitude become large when the angle of the surface of the marker 4 with respect to the optical axis of the image capturing apparatus 11 is close to 0 degrees. In addition, the errors of the absolute position and the absolute attitude may become large when the marker 4 is located at edges of the captured image.

When the errors of the absolute position and the absolute attitude are large, it is desirable not to use the absolute position and the absolute attitude as the position and the attitude of the vehicle 1. On the other hand, when the errors of the relative position and the relative attitude are excessively accumulated, it is desirable to determine the absolute position and the absolute attitude as the position and the attitude of the vehicle 1, even if the errors of the absolute position and the absolute attitude are large to some extent. In this case, it is necessary to evaluate the magnitudes of the errors of the relative position and the relative attitude, and the magnitudes of the errors of the absolute position and the absolute attitude.

Therefore, the positioning device 12 according to the embodiment calculates the reliabilities of the relative position and the relative attitude, and the reliabilities of the absolute position and the absolute attitude, and determines more reliable position and attitude as the position and the attitude of the vehicle 1.

Next, an operation of the positioning apparatus 12 will be described in detail.

[Overall Positioning Process]

Figure 8:
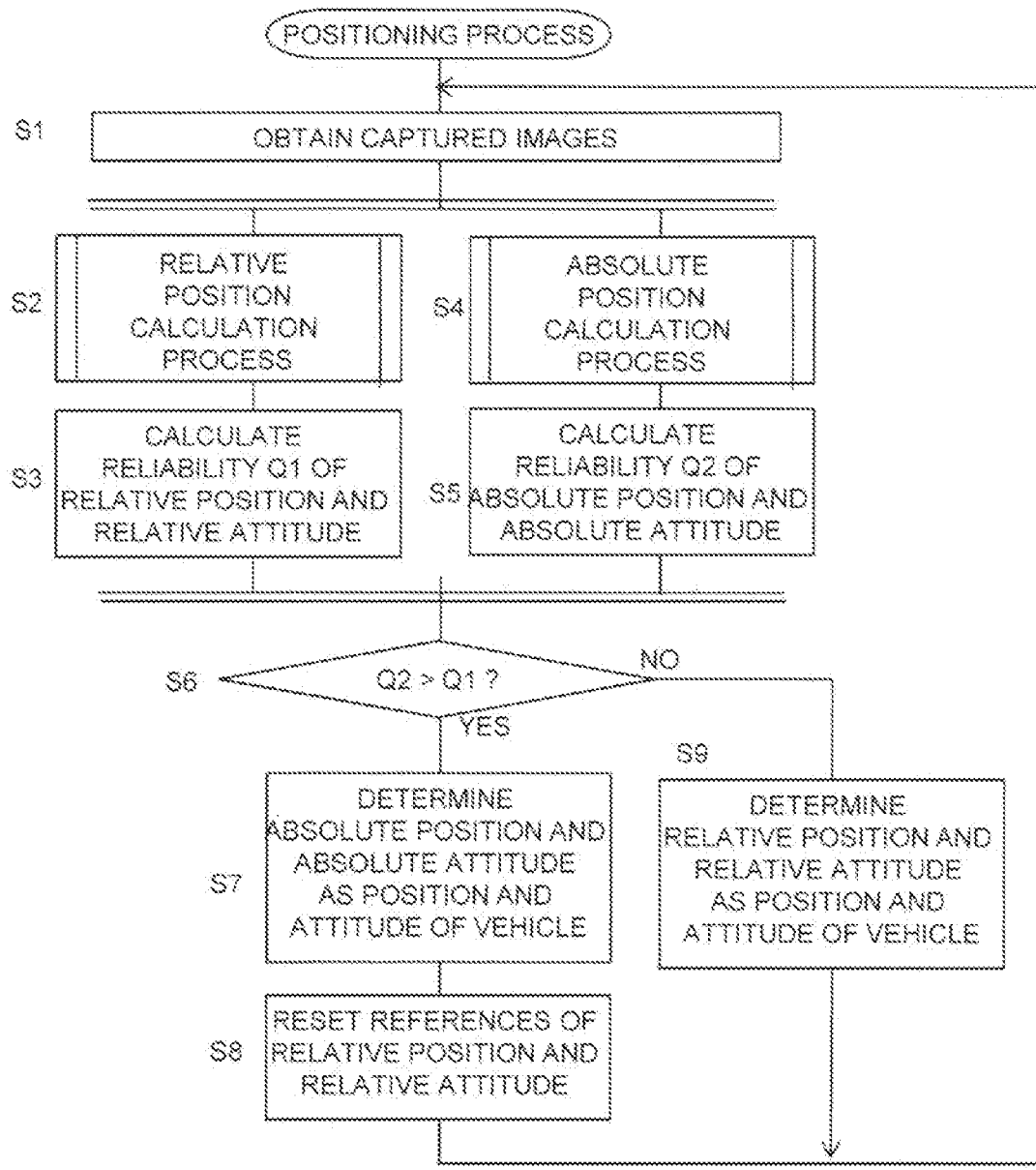
FIG. 8 is a flowchart showing a positioning process executed by the positioning apparatus 12 of FIG. 2.

FIG. 8 is a flowchart showing a positioning process executed by the positioning apparatus 12 of FIG. 2.

In step S1, the positioning apparatus 12 obtains images captured by the image capturing apparatus 11.

In step S2, the image processor 31 and the relative position calculator 32 execute a relative position calculation process to calculate a relative position and a relative attitude of the vehicle 1. In step S3, the reliability calculator 36 calculates the reliability Q1 of the relative position and the relative attitude of the vehicle 1.

In step S4, the image recognizer 33 and the absolute position calculator 34 execute an absolute position calculation process to calculate an absolute position and an absolute attitude of the vehicle 1. In step S5, the reliability calculator 36 calculates the reliability Q2 of the absolute position and the absolute attitude of the vehicle 1.

Steps S2 to S5 may be executed in parallel as shown in FIG. 8, or may be executed sequentially.

In step S6, the reliability calculator 36 determines whether or not at least one of "reliability of absolute position>reliability of relative position" and "reliability of absolute attitude>reliability of relative attitude" is satisfied; if YES, the process proceeds to step S7, and if NO, the process proceeds to step S9. Step S6 may be executed by the position and attitude determiner 37, instead by the reliability calculator 36.

In step S7, the position and attitude determiner 37 determines the absolute position and the absolute attitude of the vehicle 1 as the position and the attitude of the vehicle 1. The position and attitude determiner 37 outputs the determined position and attitude of the vehicle 1 to the communication device 13 and to the display device 14. In step S8, the position and attitude determiner 37 resets the references of the relative position and the relative attitude of the vehicle 1.

In step S9, the position and attitude determiner 37 determines the relative position and the device attitude of the vehicle 1 as the position and the attitude of the vehicle 1. The position and attitude determiner 37 outputs the determined position and attitude of the vehicle 1 to the communication device 13 and to the display device 14.

After steps S8 and S9, the process returns to step S1, and the process is repeated.

[Relative Position Calculation Process]

Figure 9:
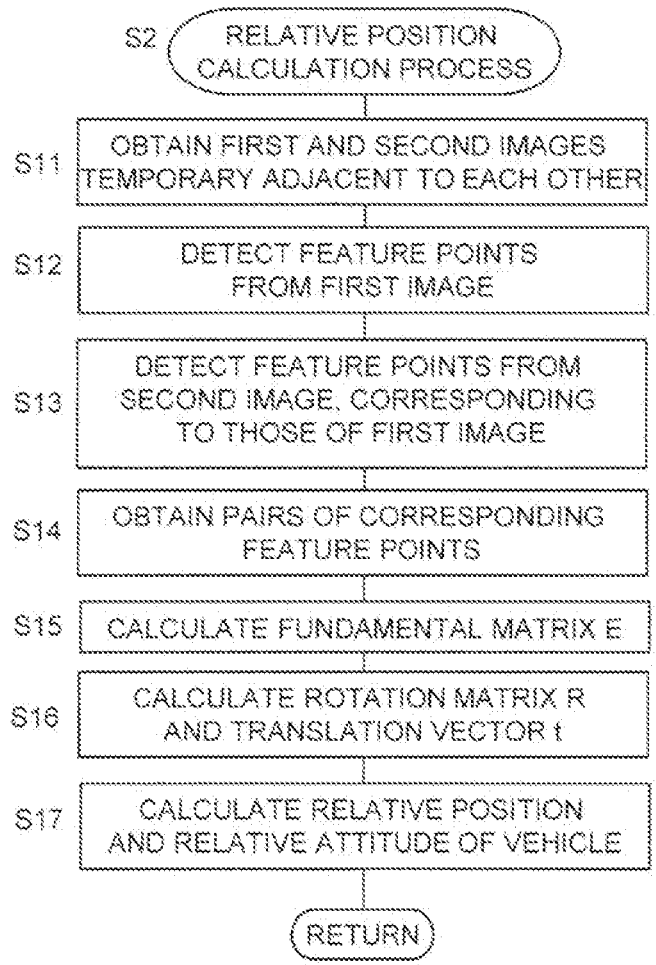
FIG. 9 is a flowchart showing a subroutine of step S2 (relative position calculation process) of FIG. 8.

FIG. 9 is a flowchart showing a subroutine of step S2 (relative position calculation process) of FIG. 8.

In step S11, the image processor 31 obtains first and second images captured at a first and a second time moments separated by a certain time length from each other (for example, first and second images of temporary adjacent frames).

In step S12, the image processor 31 detects feature points from the first image. Image processing techniques, such as the Features from Accelerated Segment Test (FAST), may be used to detect the feature points from the image.

In step S13, the image processor 31 detects feature points from the second image, corresponding to the feature points of the first image. Well-known image processing techniques, such as the Kanade-Lucas-Tomasi (KLT) tracker, may be used to detect the corresponding feature points among the images.

Figure 10:
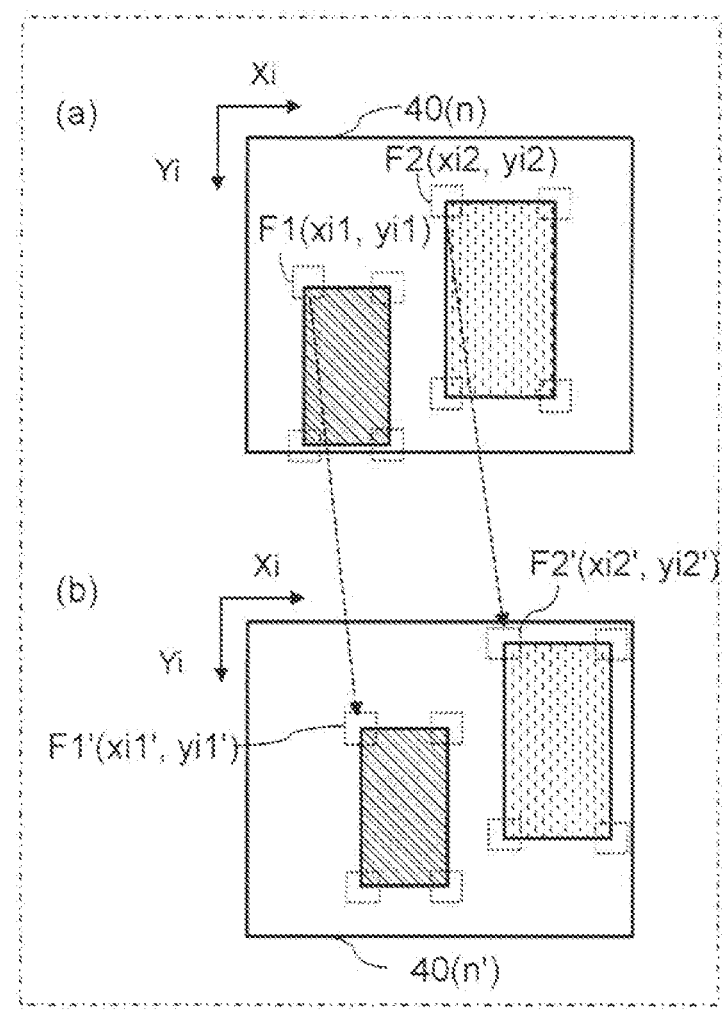
FIG. 10 shows feature points extracted by an image processor 31 of FIG. 3; (a) shows feature points F1 and F2 extracted from an image 40(n) at time moment n; and (b) shows feature points F1' and F2' extracted from an image 40(n') at time moment n'.

FIG. 10 is a diagram showing feature points extracted by the image processor 31 of FIG. 3. FIG. 10(a) shows feature points F1 and F2 extracted from an image 40(n) at time moment n. FIG. 10(b) shows feature points F1' and F2' extracted from an image 40(n') at time moment n'. In the image coordinate system of the image 40(n) of FIG. 10(a), the feature point F1 has coordinates (xi1, yi1), and the feature point F2 has coordinates (xi2, yi2). In the image coordinate system of the image 40(n') of FIG. 10(b), the feature point F1' has coordinates (xi1',yi1'), and the feature point F2' has coordinates (xi2',yi2'). The feature points F1' and F2' of FIG. 10(b) correspond to the feature points F1 and F2 of FIG. 10(a), respectively.

In step S14 of FIG. 9, the image processor 31 obtains pairs of coordinates of the corresponding feature points in the first and second images. For example, the image processor 31 obtains a pair of coordinates (xi1, yi1; xi1', yi1') of the feature points F1 and F1', and a pair of coordinates (xi2, yi2; xi2', yi2') of the feature points F2 and F2.

In step S15, the relative position calculator 32 calculates a fundamental matrix E having 3×3 elements, based on the coordinates of the feature points obtained in step S14, for example, using a 5-point algorithm.

In step S16, the relative position calculator 32 performs singular value decomposition of the fundamental matrix E to calculate a rotation matrix R and a translation vector t, which represent movement of the vehicle 1 between time moments of capturing the first and second images, respectively. The rotation matrix R indicates a change in the attitude of the vehicle 1 between the time moments of capturing the first and second images, respectively. The translation vector t indicates a change in the position of the vehicle 1 between the time moments of capturing the first and second images, respectively.

For example, calculations of the rotation matrix R and the translation vector t are formulated as follows.

The fundamental matrix E is expressed as $E=U\Sigma V^T$ by performing singular value decomposition. In this case, $\Sigma$ is a diagonal matrix having 3×3 elements, and U and V are orthogonal matrices having 3×3 elements.

The rotation matrix R is calculated as $R=UW^{-1}V^T$, using the following matrix W having 3×3 elements.

$$W = \begin{pmatrix} 0 & -1 & 0 \\ 1 & 0 & 0 \\ 0 & 0 & 1 \end{pmatrix}$$ [Mathematical Expression 1]

In addition, a matrix $T=VW\Sigma V^T$ having 3×3 elements is calculated to obtain the translation vector t. The matrix T satisfies E=TR, and is represented as follows.

$$T = \begin{pmatrix} 0 & -t_z & t_y \\ t_z & 0 & -t_x \\ -t_y & t_x & 0 \end{pmatrix}$$ [Mathematical Expression 2]

The translation vector t is represented as $t=(t_x, t_y, t_z)^T$ using the elements of the matrix T.

In step S17, the relative position calculator 32 calculates the relative position and the relative attitude of the vehicle 1. When the vehicle 1 has a relative position t(n−1) and a relative attitude R(n−1) at an most recent time moment n−1, a relative position t(n) of the vehicle 1 at the current time moment n is represented as t(n)=t(n−1)+tR(n−1), using the translation vector t calculated in step S16. In addition, a relative attitude R(n) of the vehicle 1 at the current time moment n is represented as R(n)=RR(n−1), using the rotation matrix R calculated in step 316. Thus, the relative position calculator 32 calculates the relative position and the relative attitude of the vehicle 1 with respect to the reference position and the reference attitude, by cumulatively adding a plurality of translation vectors, and cumulatively multiplying a plurality of rotation matrices. The relative position calculator 32 send the calculated relative position and the calculated relative attitude of the vehicle 1, to the position and attitude determiner 37.

[Reliabilities of Relative Position and Relative Attitude]

Figure 11:
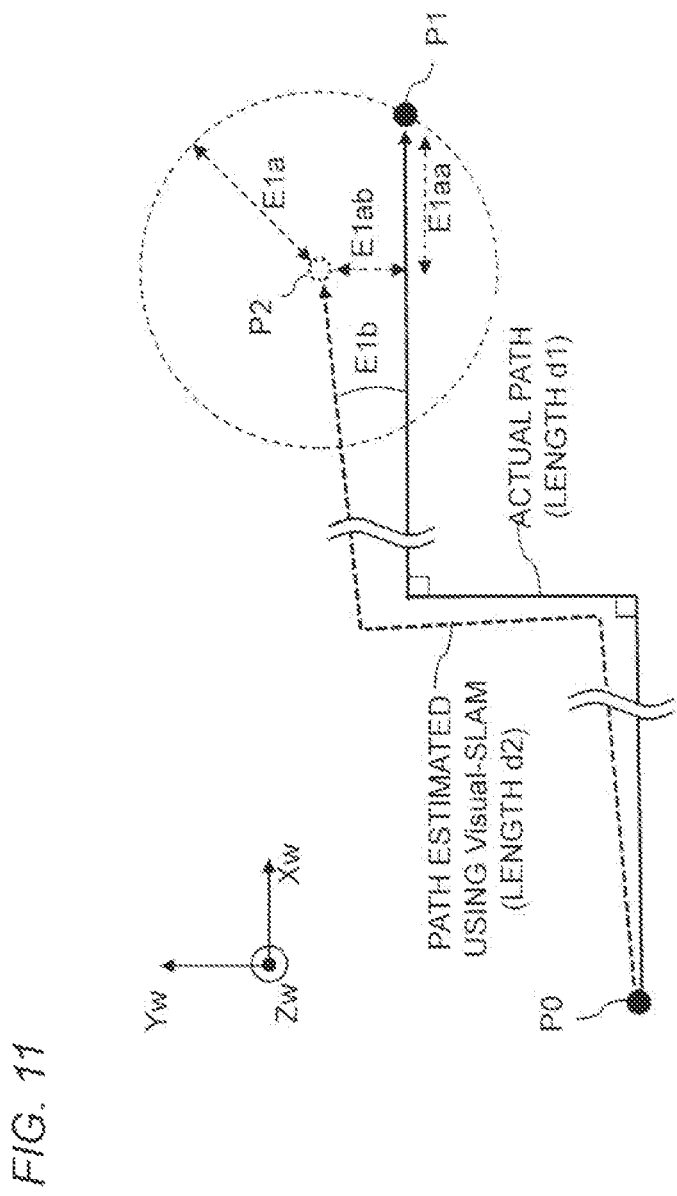
FIG. 11 is a diagram for explaining calculation of reliabilities of a relative position and a relative attitude calculated by a relative position calculator 32 of FIG. 3.

FIG. 11 is a diagram for explaining calculation of the reliabilities of the relative position and the relative attitude calculated by the relative position calculator 32 of FIG. 3.

For example, the reliability calculator 36 calculates the reliabilities of the relative position and the relative attitude, such that the reliabilities increase as the moving distance and the rotation angle from the reference position and the reference attitude of the vehicle 1 decrease, and such that the reliabilities decrease as the moving distance and the rotation angle increase. The reliabilities of the relative position and the relative attitude are represented by, for example, estimation errors calculated based on the images captured by the image capturing apparatus 11, using a theoretical error model (that is, statistical errors from the true values of the position and the attitude) experimentally determined in advance. The smaller the estimation error, the larger the reliability.

As a preliminary experiment, the vehicle 1 is actually driven under various conditions, and a difference between the position and the attitude of the vehicle 1 on the actual path, and the position and the attitude of the vehicle 1 on the path estimated using Visual-SLAM is calculated. Thus, theoretical errors of Visual-SLAM, that is, a theoretical error Era of the moving distance of the vehicle 1, and a theoretical error Erb of the rotation angle during the movement of the vehicle 1, are obtained. Here, the theoretical error Era of the moving distance indicates, for example, a ratio of the error of the moving distance estimated using Visual-SLAM to the actual moving distance calculated and averaged under various conditions. The theoretical error Erb of the rotation angle indicates, for example, a ratio Erb of the error of the rotation angle estimated using Visual-SLAM to the actual rotation angle calculated and averaged under various conditions.

In the example of FIG. 11, the vehicle 1 actually travels on a path from the point P0 to the point P1. For example, the actual path P0→P1 has a length d1=50 m, and includes two corners of 90 degrees. Therefore, the vehicle 1 rotates through A1=|90 degrees|×2=180 degrees while traveling along the path P0→P1. Further, when the vehicle 1 arrives at the point P1, the position of the vehicle 1 estimated using Visual-SLAM is at the point P2. The points P1 and P2 have a positional error E1aa=3.85 m along the traveling direction of the vehicle 1, and a positional error E1ab=1.6 m along the direction orthogonal to the traveling direction of the vehicle 1. Thus, the path P0→P2 estimated using Visual-SLAM has a length $d2=((d1-E1aa)^2+E1ab^2)^{1/2}=((50 \text{ m}-3.85 \text{ m})^2+1.6^2)^{1/2}=46.2 \text{ m}$. In addition, the path P0→P1 and the path P0→P2 have an angular error $E1b=\arcsin(E1ab/d2)=\arcsin(1.6/46.2)=2$ degrees. In this case, the theoretical errors of Visual-SLAM, that is, the theoretical error Era of the moving distance and the theoretical error Erb of the rotation angle are calculated as follows.

$$Era=E1aa/d1=3.85/50=0.077$$

$$Erb=E1b/A1=2/180=0.011$$

Here, the theoretical error Era of the moving distance is calculated based on the component of the moving distance along the traveling direction of the vehicle 1.

In this way, given the theoretical error model experimentally determined in advance, and when the vehicle 1 moves along an arbitrary path, the estimation errors of the relative position and the relative attitude of the vehicle 1 are calculated as follows.

Consider that Era=0.077 and Erb=0.011 are given as theoretical errors of Visual-SLAM, and the vehicle 1 travels on the path P0→P1 having the length d1=50 m and including two corners of 90 degrees. In an actual path, the length d1=50 m and the rotation angle A1=180 degrees P0→P1 are unknown. On the other hand, it can be seen that the path P0→P2 estimated using Visual-SLAM has, for example, the length d2=46.2 m and a rotation angle A2=182 degrees. Therefore, the estimation error E1a of the relative position is calculated as follows.

$$E1b=A2 \times Erb=182 \text{ degrees} \times 0.011=2 \text{ degrees}$$

$$E1ab=d2 \times \sin(E1b)=46.2 \text{ m} \times \sin(2 \text{ degrees})=1.6 \text{ m}$$

$$E1aa=d2 \times \cos(E1b) \times Era/(1 \pm Era)=46.2 \text{ m} \times \cos(2 \text{ degrees}) \times 0.077/(1 \pm 0.077)=3.3 \text{ m}, 3.85 \text{ m}$$

$$E1a=(E1aa^2+E1ab^2)^{1/2}=(3.85^2+1.6^2)^{1/2}=4.2 \text{ m}$$

On the other hand, the estimation error of the relative attitude is equal to the estimation error E1b of the angle between the path P0→P1 and the path P0→P2.

As the moving distance and the rotation angle of the vehicle 1 from the reference position and the reference attitude increase, the estimation errors of the relative position and the relative attitude increase (that is, the reliabilities of the relative position and the relative attitude decrease). In addition, as the moving distance and the rotation angle decrease, the estimation errors of the relative position and the relative attitude decrease (that is, the reliabilities of the relative position and the relative attitude increase). Therefore, the reliabilities of the relative position and the relative attitude can be expressed using the estimation errors of the relative position and the relative attitude.

[Absolute Position Calculation Process]

Figure 12:
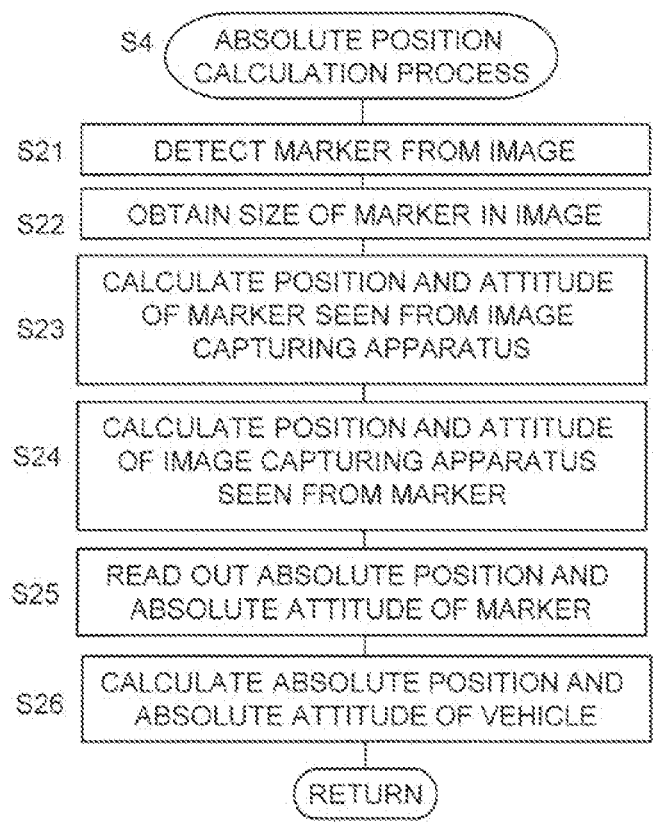
FIG. 12 is a flowchart showing a subroutine of step S4 (absolute position calculation process) of FIG. 8.

FIG. 12 is a flowchart showing a subroutine of step S4 (absolute position calculation process) of FIG. 8.

In step S21, the image recognizer 33 detects the marker 4 from the image. In this case, the image recognizer 33 detects coordinates of four vertices (corners) of the quadrangular marker 4 in the image coordinate system, and decodes the pattern of the marker 4 to obtain the identifier of the marker 4. The image recognizer 33 may detect coordinates of some predetermined points, instead of the four vertices of the marker 4.

Figure 13:
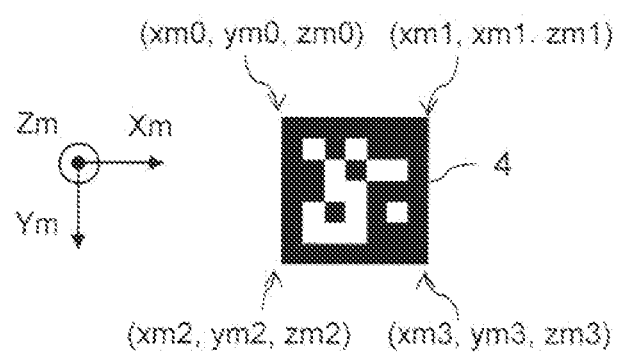
FIG. 13 is a diagram showing coordinates of vertices of the marker 4 in a marker coordinate system.

FIG. 13 is a diagram showing the coordinates of the vertices of the marker 4 in the marker coordinate system. In the marker coordinate system (Xm, Ym, Zm), the four vertices of the marker 4 have coordinates (xm0, ym0, zm0), (xm1, ym1, zm1), (xm2, ym2, zm2), and (xm3, ym3, zm3), respectively. Since the size of the marker 4 is known, the coordinates of the four vertices of the marker 4 in the marker coordinate system are also known. For example, when the upper left vertex of the marker 4 of FIG. 13 is an origin of the marker coordinate system (Xm, Ym, Zm), and the marker 4 has an actual size of 30 cm×30 cm, the vertices of the marker 4 have coordinates, for example, (xm0, ym0, zm0)=(0, 0, 0), (xm1, ym1, zm1)=(0.3, 0, 0), (xm2, ym2, zm2)=(0, 0.3, 0), and (xm3, ym3, zm3)=(0.3, 0.3, 0).

Figure 14:
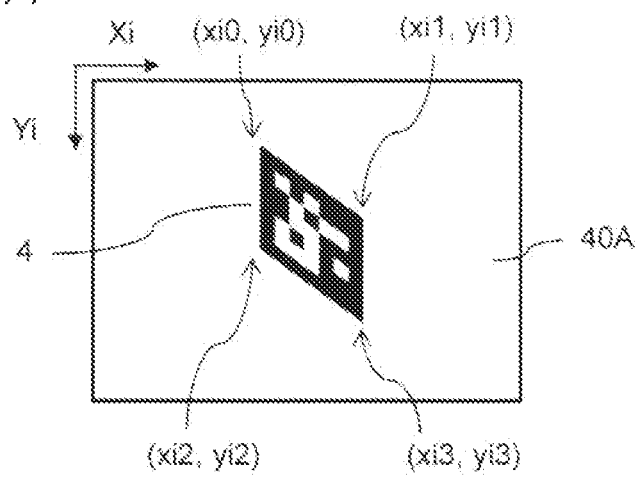
FIG. 14 is a diagram showing coordinates of vertices of the marker 4 in an image 40 captured by the image capturing apparatus 11 of FIG. 1.

FIG. 14 is a diagram showing coordinates of vertices of the marker 4 in an image 40 captured by the image capturing apparatus 11 of FIG. 1. In the image coordinate system (Xi, Yi), the four vertices of the marker 4 have coordinates (xi0, yi0), (xi1, yi1), (xi2, yi2), and (xi3, yi3), respectively.

In step S22 of FIG. 12, the absolute position calculator 34 obtains an apparent size of the marker 4 in the image captured by the image capturing apparatus 11. When the vehicle 1 moves mainly in a horizontal plane (that is, in the Xw-Yw plane) in the world coordinate system, the apparent size of the marker 4 in the image may be represented by, for example, the length (number of pixels) of the marker 4 in a longitudinal direction (that is, the Yi direction). Alternatively, the apparent size of the marker 4 in the image may be represented by a combination of the longitudinal length and the lateral length of the marker 4. The apparent size of the marker 4 in the image corresponds to the distance from the image capturing apparatus 11 to the marker 4. Note that, length of the marker 4 in the lateral direction (that is, the Xi direction) varies not only depending on the distance, but also depending on the angle at which the image capturing apparatus 11 captures the marker 4.

In step S23 of FIG. 12, the absolute position calculator 34 calculates the position and the attitude of the marker 4 in a three-dimensional coordinate system whose origin is located at the image capturing apparatus 11 (camera coordinate system), based on the coordinates of the marker 4 detected in step S21. That is, the absolute position calculator 34 calculates the position and the attitude of the marker 4 as seen from the image capturing apparatus 11. For example, the absolute position calculator 34 calculates the position and the attitude of the marker 4 as seen from the image capturing apparatus 11, by solving a perspective n point (PnP) problem based on the coordinates of the four vertices of the marker 4 in the two-dimensional image coordinate system, and based on the coordinates of the four vertices of the marker 4 in the three-dimensional marker coordinate system.

In step S24, the absolute position calculator 34 calculates the position and the attitude of the image capturing apparatus 11 in the marker coordinate system (i.e., the position and the attitude of the image capturing apparatus 11 as seen from the marker 4). The position of the marker 4 as seen from the image capturing apparatus 11 is represented by the translation vector t, and the attitude of the marker 4 as seen from the image capturing apparatus 11 is represented by the rotation matrix R. In this case, the attitude of the image capturing apparatus 11 as seen from the marker 4 is represented by $R^{-1}$, and the position of the image capturing apparatus 11 as seen from the marker 4 is represented by $-R^{-1}t$.

In step S25, the absolute position calculator 34 reads out the position and the attitude of the marker 4 in the world coordinate system (i.e., the absolute position and the absolute attitude of the marker 4) from the storage apparatus 35, based on the identifier of the marker 4 detected in step S21.

In step S26, the absolute position calculator 34 calculates the position and the attitude of the vehicle 1 in the world coordinate system (i.e., the absolute position and the absolute attitude of the vehicle 1), based on the position and the attitude of the image capturing apparatus 11 in the marker coordinate system calculated in step S23, and based on the position and the attitude of the marker 4 in the world coordinate system read out in step S26. The position and the attitude of the vehicle 1 in the world coordinate system can be obtained by adding the position and the attitude of the marker 4 in the world coordinate system, as offset values, to the position and the attitude of the image capturing apparatus 11 in the marker coordinate system. The absolute position calculator 34 send the calculated relative position and the calculated relative attitude of the vehicle 1, to the position and attitude determiner 37.

[Reliabilities of Absolute Position and Absolute Attitude]

Figure 15:
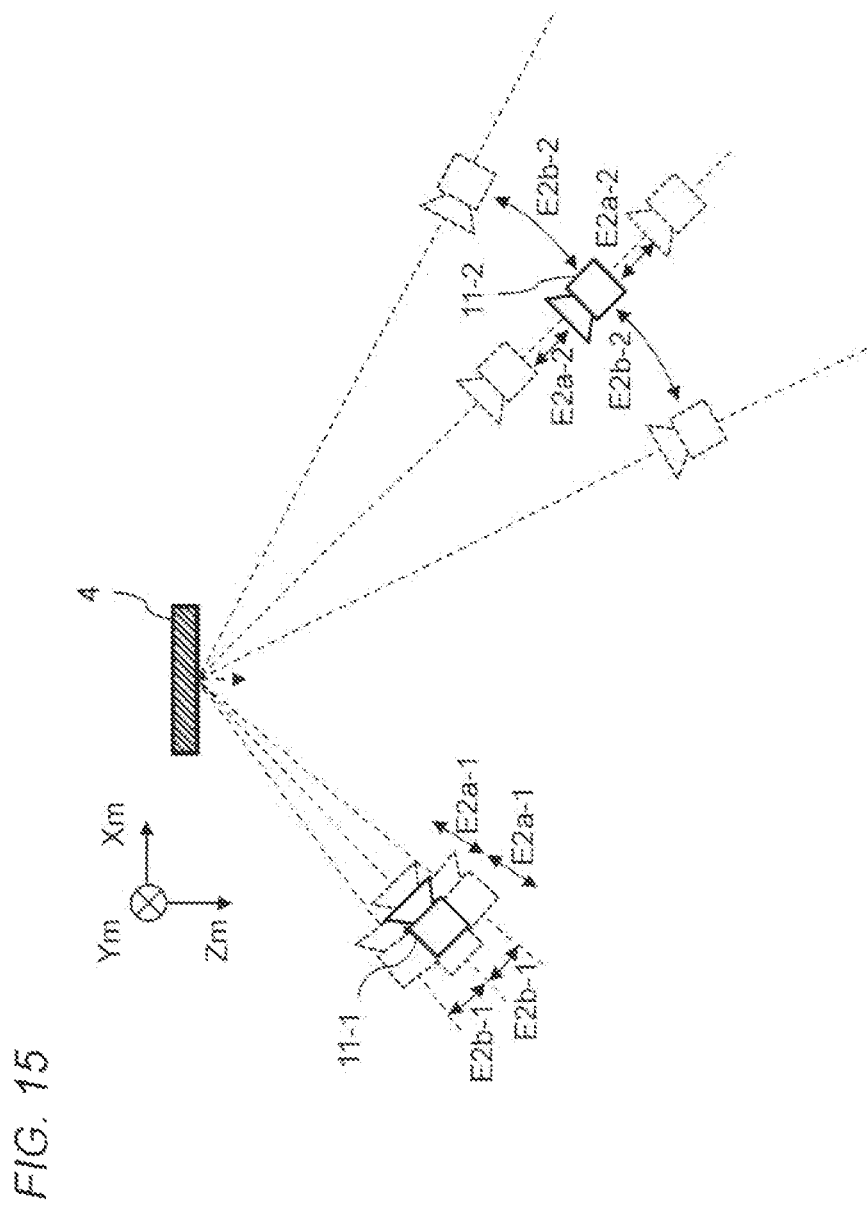
FIG. 15 is a diagram for explaining calculation of reliabilities of an absolute position and an absolute attitude calculated by an absolute position calculator 34 of FIG. 3.

FIG. 15 is a diagram for explaining calculation of the reliabilities of the absolute position and the absolute attitude calculated by the absolute position calculator 34 of FIG. 3.

The reliability calculator 36 calculates the reliabilities of the absolute position and the absolute attitude, for example, such that the reliabilities increase as the apparent size of the marker 4 in the image captured by the image capturing apparatus 11 increases, and such that the reliabilities decrease as the apparent size of the marker 4 in the image decreases. The reliabilities of the absolute position and the absolute attitude are represented by, for example, estimation errors calculated based on the image captured by the image capturing apparatus 11, using a theoretical error model (that is, statistical errors from the true values of the position and the attitude) experimentally determined in advance. The smaller the estimation error, the larger the reliability.

As a preliminary experiment, the marker 4 is captured by the image capturing apparatus 11 under various conditions, and errors between the actual position and attitude of the vehicle 1, and the absolute position and the absolute attitude of the vehicle 1 calculated based on the marker 4 is calculated. In this case, the marker 4 is captured by the image capturing apparatus 11 from a plurality of predetermined observation points located at various distances and angles with respect to the marker 4. The observation points may be, for example, grid points having a predetermined interval. The marker 4 may be captured while changing the orientation of the image capturing apparatus 11.

The example of FIG. 15 shows an image capturing apparatus 11-1 relatively close to the marker 4, and an image capturing apparatus 11-2 relatively remote from the marker 4. The vehicle 1 provided with the image capturing apparatus 11-1 has an absolute position error E2$a$-1 and an absolute attitude error E2$b$-1. Further, the vehicle 1 provided with the image capturing apparatus 11-2 has an absolute position error E2$a$-2 larger than the absolute position error E2$a$-1, and an absolute attitude error E2$b$-2 larger than the absolute attitude error E2$b$-1. Therefore, according to FIG. 15, it is considered that the errors of the absolute position and the absolute attitude depend on the distance from the image capturing apparatus 11 to the marker 4.

Figure 16:
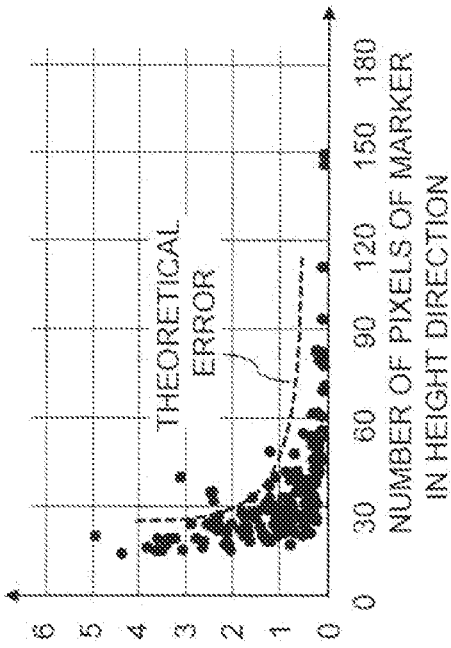
FIG. 16 is a graph for explaining that an error of the absolute position depends on an apparent size of the marker 4 in the image captured by the image capturing apparatus 11 of FIG. 1.
Figure 17:
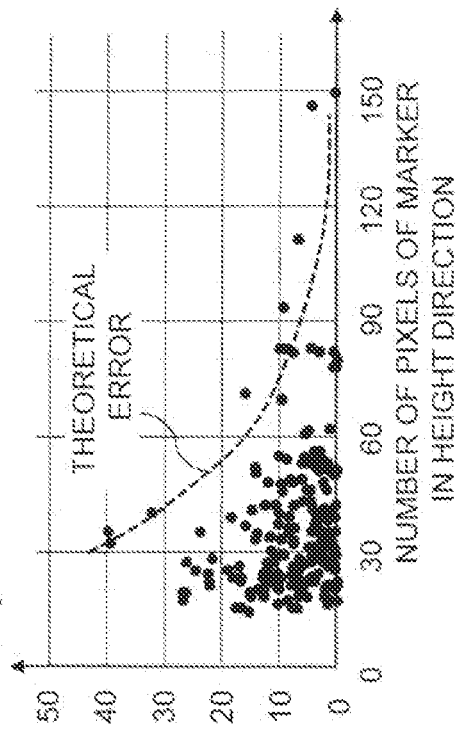
FIG. 17 is a graph for explaining that an error of the absolute attitude depends on an apparent size of the marker 4 in the image captured by the image capturing apparatus 11 of FIG. 1.

In the example of FIG. 15, the errors E2$b$-1 and E2$b$-2 of the absolute attitude are shown in association with the marker coordinate system. As described in step S26 of FIG. 12, the attitude in the marker coordinate system is converted into the attitude in the world coordinate system, FIG. 16 is a graph for explaining that an error of the absolute position depends on the apparent size of the marker 4 in the image captured by the image capturing apparatus 11 of FIG. 1. FIG. 17 is a graph for explaining that an error of the absolute attitude depends on the apparent size of the marker 4 in the image captured by the image capturing apparatus 11 of FIG. 1. The points plotted in FIGS. 16 and 17 indicate the results of the preliminary experiment as mentioned above. Here, the apparent size of the marker 4 in the image captured by the image capturing apparatus 11 varies depending on the distance from the image capturing apparatus 11 to the marker 4. According to FIGS. 16 and 17, it is considered that there is a correlation between the longitudinal length of the marker 4, and the errors of the absolute position and the absolute attitude. Therefore, a curve is fitted to each of the graphs of FIGS. 16 and 17, and based on the fitted curve, the absolute position theoretical error E2$a$ and the absolute attitude theoretical error E2$b$ are expressed, for example, as follows.

$$E2a = 40/\text{longitudinal length(number of pixels)}$$

$$E2b = 400/\text{longitudinal length(number of pixels)}$$

Thus, given the theoretical error model experimentally determined in advance, and when the vehicle 1 moves along an arbitrary path, the absolute position theoretical error E2$a$ and the absolute attitude theoretical error E2$b$ can be calculated as the estimation errors of the absolute position and the absolute attitude.

As the apparent size of the marker 4 in the image captured by the image capturing apparatus 11 decreases, the estimation errors of the absolute position and the absolute attitude increase (that is, the reliabilities of the absolute position and the absolute attitude decrease). In addition, as the apparent size of the marker 4 in the image increases, the estimation errors of the absolute position and the absolute attitude decrease (that is, the reliabilities of the absolute position and the absolute attitude increase). Therefore, the reliabilities of the absolute position and the absolute attitude can be expressed using the estimation errors of the absolute position and the absolute attitude.

According to the first embodiment, it is possible to accurately measure the position and the attitude of the vehicle 1, by calculating the reliabilities of the relative position and the relative attitude, and the reliabilities of the absolute position and the absolute attitude, and determining more reliable position and attitude as the position and the attitude of the vehicle 1. According to the first embodiment, for example, the estimation errors of the relative position and the relative attitude can be calculated as the reliabilities of the relative position and the relative attitude, the estimation errors of the absolute position and the absolute attitude can be calculated as the reliabilities of the absolute position and the absolute attitude, and the position and attitude with the smaller estimation errors can be determined as the position and the attitude of the vehicle 1.

According to the first embodiment, it is possible to measure the position of the vehicle 1 at a low cost using the image capturing apparatus 11, even in an indoor place where radio waves from GPS satellites can not be received, such as a warehouse or a factory. Since it is not necessary to dispose a large number of wireless transmitters for transmitting wireless signals, initial costs can be reduced.

According to the first embodiment, it is possible to improve work based on the travelling path of the vehicle 1 obtained from positioning results.

According to the first embodiment, it can be utilized for determining the necessity of maintenance, the necessity of renewal of lease contracts, and the like, based on the travelled distance of the vehicle 1.

According to the first embodiment, it is possible to optimize a layout of passageways, shelves, and the like in a warehouse or a factory, based on a heat map of movement of the vehicle 1.

According to the first embodiment, it is possible to visualize a place where the vehicles 1 passes by each other during movement, based on differences among trajectories of the vehicles 1, and therefore, review paths and width of passageways to improve safety.

First Modification of First Embodiment

Figure 18:
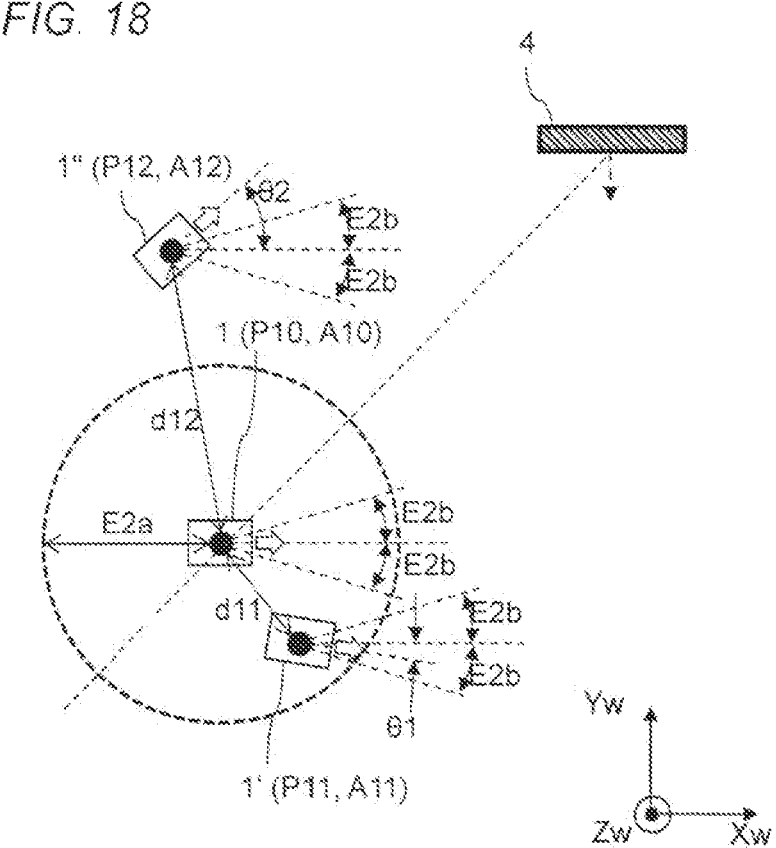
FIG. 18 is a diagram for explaining calculation of reliabilities of the relative position and the relative attitude in positioning process according to a first modification of the first embodiment.

FIG. 18 is a diagram for explaining calculation of reliabilities of the relative position and the relative attitude in positioning process according to a first modification of the first embodiment. Instead of calculating the reliabilities of the relative position and the relative attitude based on the moving distance and the rotation angle of the vehicle 1 as described with reference to FIG. 11, the reliability calculator 36 may calculate the reliabilities of the relative position and the relative attitude as follows.

The reliability calculator 36 calculates the reliabilities of the relative position and the relative attitude, such that the reliabilities increase as the difference between the relative position and the absolute position decreases, and as the difference between the relative attitude and the absolute attitude decreases, and such that the reliabilities decrease as the difference between the relative position and the absolute position increases, and as the difference between the relative attitude and the absolute attitude increases. In this case, the reliabilities of the relative position and the relative attitude are represented by the difference between the relative position and the absolute position, and the difference between the relative attitude and the absolute attitude (also referred to as "estimation errors of the relative position and the relative attitude").

In FIG. 18, the vehicle 1 has an absolute position P10 and an absolute attitude A10 calculated based on the marker 4. In addition, the vehicle 1 has a relative position P11 and a relative attitude A11 (shown as "vehicle 1'" in FIG. 18), or a relative position P12 and a relative attitude A12 (shown as "vehicle 1"" in FIG. 18), which are calculated using Visual-SLAM. The vehicle 1 has the estimation error E2$a$ of the absolute position, and the estimation error E2$b$ of the absolute attitude.

The reliability calculator 36 calculates a distance between the relative position and the absolute position of the vehicle 1 as a relative position estimation error of the vehicle 1. When the distance between the relative position and the absolute position of the vehicle 1 is larger than the estimation error E2$a$ of the absolute position, the position and attitude determiner 37 determines the absolute position as the position of the vehicle 1. Further, when the distance between the relative position and the absolute position of the vehicle 1 is equal to or smaller than the estimation error E2$a$ of the absolute position, the position and attitude determiner 37 determines the relative position as the position of the vehicle 1. Therefore, in the example of FIG. 18, when the vehicle 1 has the relative position P11, the relative position P11 of the vehicle 1 has an estimation error d11<E2$a$, and the position and attitude determiner 37 determines the relative position P11 as the position of the vehicle 1. On the other hand, when the vehicle 1 has the relative position P12, the relative position P12 of the vehicle 1 has an estimation error d12>E2$a$, and the position and attitude determiner 37 determines the absolute position P10 as the position of the vehicle 1.

The reliability calculator 36 calculates an angular difference between the relative attitude and the absolute attitude of the vehicle 1 as an estimation error of the relative attitude of the vehicle 1. When the angular difference between the relative attitude and the absolute attitude of the vehicle 1 is larger than the estimation error E2$b$ of the absolute attitude, the position and attitude determiner 37 determines the absolute attitude as the attitude of the vehicle 1. Further, when the angular difference between the relative attitude and the absolute attitude of the vehicle 1 is equal to or smaller than the estimation error E2$b$ of the absolute attitude, the position and attitude determiner 37 determines the relative attitude as the attitude of the vehicle 1. Therefore, in the example of FIG. 18, when the vehicle 1 has the relative attitude A11, the relative attitude A11 of the vehicle 1 has an estimation error $\theta$1<E2$b$, and the position and attitude determiner 37 determines the relative attitude A11 as the attitude of the vehicle 1. On the other hand, when the vehicle 1 has the relative attitude A12, the relative attitude A12 of the vehicle 1 has an estimation error $\theta$2>E2$b$, and the position and attitude determiner 37 determines the absolute attitude A10 as the attitude of the vehicle 1.

As the difference between the relative position and the absolute position increases, and as the difference between the relative attitude and the absolute attitude increases, the estimation errors of the relative position and the relative attitude increase (that is, the reliabilities of the relative position and the relative attitude decrease). In addition, as the difference between the relative position and the absolute position decreases, and as the difference between the relative attitude and the absolute attitude decreases, the estimation errors of the relative position and the relative attitude decrease (that is, the reliabilities of the relative position and the relative attitude increase). Therefore, the reliabilities of the relative position and the relative attitude can be expressed using the estimation errors of the relative position and the relative attitude.

In the example of FIG. 18, the estimation errors of the absolute position and the absolute attitude are calculated in a manner similar to that of the case described with reference to FIGS. 15 to 17.

According to the first modification of the first embodiment, it is possible to accurately measure the position and the attitude of the vehicle 1, by calculating the estimation errors of the relative position and the relative attitude, and the estimation errors of the absolute position and the absolute attitude, and determining the position and attitude with the smaller estimation errors (that is, more reliable position and attitude) as the position and the attitude of the vehicle 1.

Second Modification of First Embodiment

Figure 19:
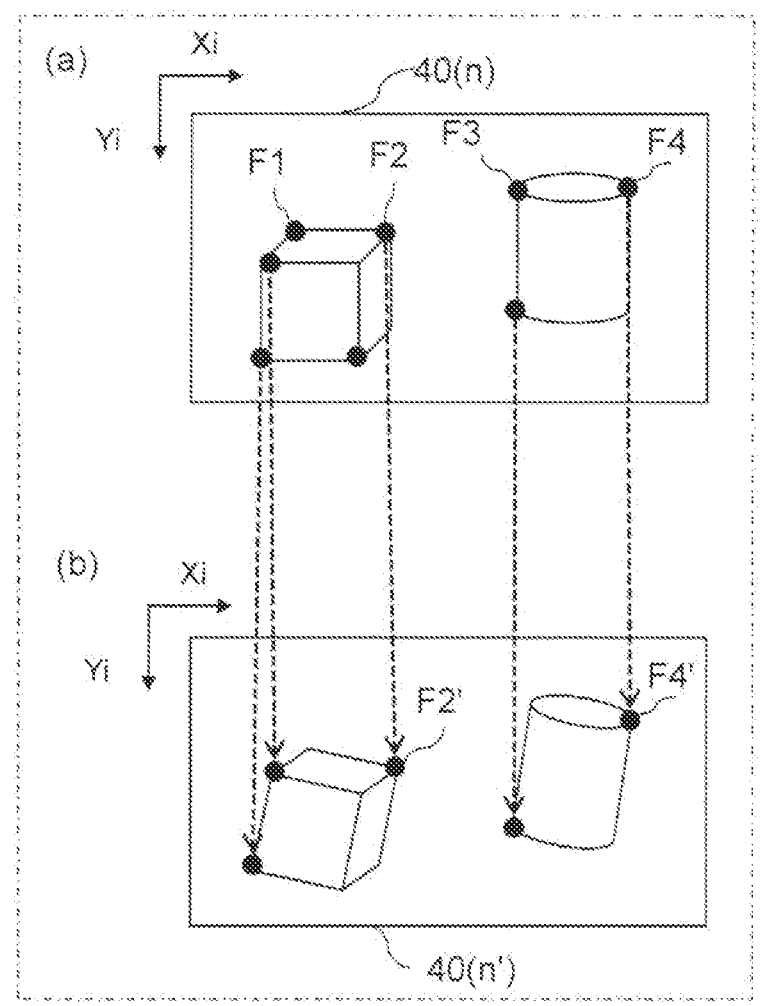
FIG. 19 is a diagram for explaining calculation of reliabilities of the relative position and the relative attitude in positioning process according to a second modification of the first embodiment.

FIG. 19 is a diagram for explaining calculation of reliabilities of the relative position and the relative attitude in positioning process according to a second modification of the first embodiment. The reliability calculator 36 may consider the reliability of tracking when calculating the estimation errors of the relative position and the relative attitude as described with reference to FIG. 11 or 18.

The relative position calculator 32 calculates the relative position and the relative attitude based on the feature points tracked in a plurality of temporally adjacent images. The reliability calculator 36 calculates the reliability of tracking based on the number of feature points that are successfully tracked in the plurality of temporally adjacent images, and calculates the reliabilities of the relative position and the relative attitude such that the reliabilities of the relative position and the relative attitude increase as the reliability of tracking increases. In this case, the reliabilities of the relative position and the relative attitude are represented by, for example, values obtained by multiplying the estimation errors of the relative position and the relative attitude, which are calculated in a manner similar to that of the case described with reference to FIG. 11 or 18, by a coefficient indicating the reliability of tracking.

Referring to FIG. 19(a), feature points F1 to F4 are detected in an image 40(n). Referring to FIG. 19(b), in an image 40(n'), a feature point F2' corresponding to the feature point F2 of FIG. 19(a), and a feature point F4' corresponding to the feature point F4 of FIG. 19(a) are detected, but the detection of the feature points corresponding to the feature points F1 and F3 of FIG. 19(a) fails.

The estimation error E1a' of the relative position and the estimation error E1b' of the relative attitude in consideration of tracking are calculated as follows.

$$E1a' = \lambda \times (1/Tf) \times E1a$$

$$E1b' = \lambda \times (1/Tf) \times E1b$$

$\lambda$ is a predetermined constant. Tf indicates the reliability of tracking, and is calculated as follows.
Tf=total number of successfully tracked feature points/ moving distance of vehicle 1 (m)

For example, given the vehicle 1 moves over a moving distance of 10 m, and 40000 feature points are successfully tracked in two temporally adjacent images, and $\lambda$=3000, the estimation errors of the relative position and the relative attitude are calculated as follows.

$$Tf = 40000/10 = 4000$$

$$E1a' = 3000 \times (1/4000) \times E1a$$

$$E1b' = 3000 \times (1/4000) \times E1b$$

The estimation error E1a of the relative position and the relative attitude estimation error E1b are calculated in a manner similar to that of the case described with reference to FIG. 11 or 18.

As the reliability of tracking decreases, the estimation errors of the relative position and the relative attitude increase (that is, the reliabilities of the relative position and the relative attitude decrease). Furthermore, as the reliability of tracking increases, the estimation errors of the relative position and the relative attitude decrease (that is, the reliabilities of the relative position and the relative attitude increase). Therefore, the reliabilities of the relative position and the relative attitude can be expressed using the estimation errors of the relative position and the relative attitude in consideration of the reliability of tracking.

The reliabilities of the absolute position and the absolute attitude are calculated in a manner similar to that of the case described with reference to FIGS. 15 to 17.

According to the second modification of the first embodiment, it is possible to more accurately measure the position and the attitude of the vehicle 1, by considering the reliability of tracking.

Third Modification of First Embodiment

As the reliabilities of the relative position and the relative attitude, the reliability calculator 36 may calculate variances of the amounts of change of the relative position and the relative attitude, instead of calculating the estimation errors of the relative position and the relative attitude in a manner similar to that of the case described with reference to FIG. 11. FIG. 18, or FIG. 19.

The reliability calculator 36 calculates the reliabilities of the relative position and the relative attitude such that the reliability increases as the variance of the amount of change of the relative position or the relative attitude decreases, and such that the reliability decreases as the variance of the amount of change of the relative position or the relative attitude increases. In this case, the reliabilities of the relative position and the relative attitude are represented by the variance of the amount of change of the relative position or the relative attitude.

Figure 20:
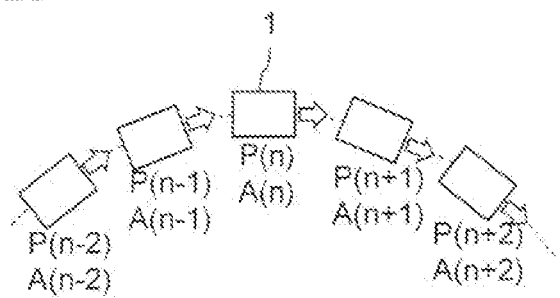
FIG. 20 is a diagram for explaining calculation of reliabilities of the relative position and the relative attitude in positioning process according to a third modification of the first embodiment, the diagram indicating a first trajectory of the vehicle 1.
Figure 21:
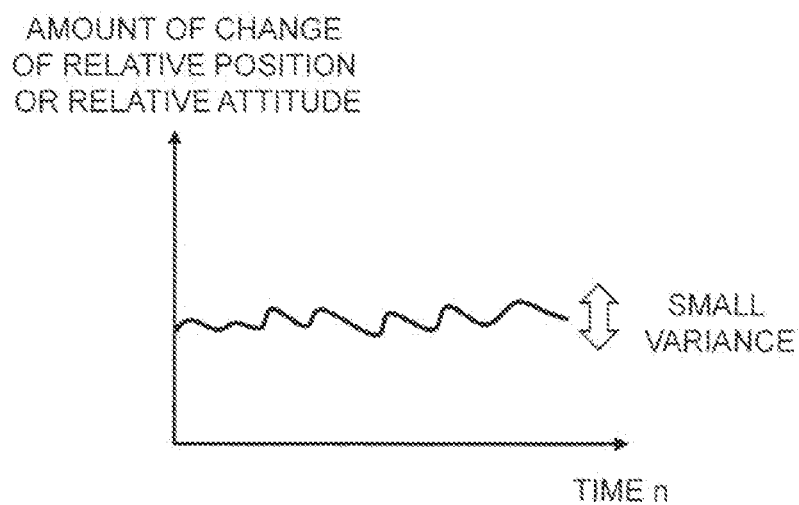
FIG. 21 is a graph schematically showing an amount of change of the relative position or the relative attitude of the vehicle 1 of FIG. 20.

FIG. 20 is a diagram for explaining calculation of the reliabilities of the relative position and the relative attitude in positioning process according to a third modification of the first embodiment, the diagram indicating a first trajectory of the vehicle 1. FIG. 21 is a graph schematically showing an amount of change of the relative position or the relative attitude of the vehicle 1 of FIG. 20. As shown in FIG. 20, the vehicle 1 has relative positions P(n−2) to P(n+2) and relative attitudes A(n−2) to A(n+2) from time n−2 to time n+2. In this case, the amounts of change of the relative position and the relative attitude are small, and the variances thereof are also small.

Figure 22:
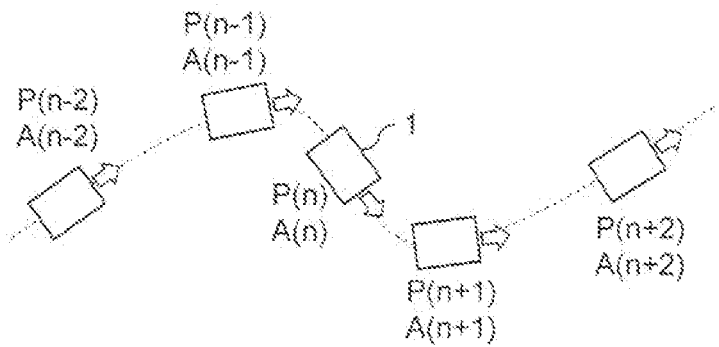
FIG. 22 is a diagram for explaining calculation of the reliabilities of the relative position and the relative attitude in the positioning process according to the third modification of the first embodiment, the diagram indicating a second trajectory of the vehicle 1.
Figure 23:
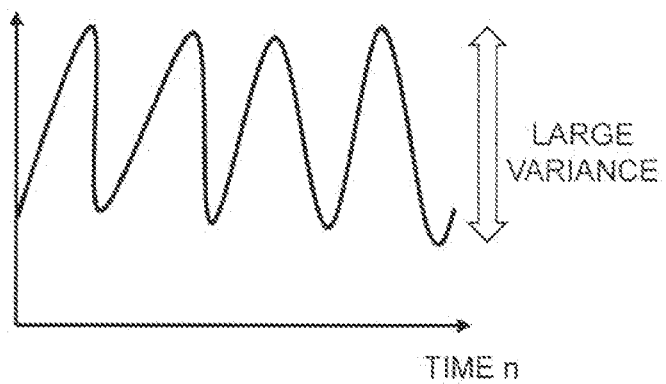
FIG. 23 is a graph schematically showing an amount of change of the relative position or the relative attitude of the vehicle 1 of FIG. 22.

FIG. 22 is a diagram for explaining calculation of the reliabilities of the relative position and the relative attitude in the positioning process according to the third modification of the first embodiment, the diagram indicating a second trajectory of the vehicle 1. FIG. 23 is a graph schematically showing an amount of change of the relative position or the relative attitude of the vehicle 1 of FIG. 22. As shown in FIG. 22, the vehicle 1 has the relative positions P(n−2) to P(n+2) and the relative attitudes A(n−2) to A(n+2) from the time n−2 to the time n+2. In this case, the amounts of change in the relative position and the relative attitude vary more largely per frame than the case of FIG. 20, and the variances thereof are also larger than the case of FIG. 20.

When the amounts of change of the relative position and the relative attitude largely vary per frame, it is considered to be difficult to accurately calculate the relative position and the relative attitude. As the variance of the amount of change of the relative position or the relative attitude increases, the reliabilities of the relative position and the relative attitude decrease. In addition, as the variance of the amount of change of the relative position or the relative attitude decreases, the reliabilities of the relative position and the relative attitude increase. Therefore, the reliabilities of the relative position and the relative attitude can be expressed using the variances of the amounts of change of the relative position and the relative attitude.

The reliabilities of the absolute position and the absolute attitude are calculated in a manner similar to that of the case described with reference to FIGS. 15 to 17.

According to the third modification of the first embodiment, the amounts of change of the variances of the relative position and the relative attitude can be calculated as the reliabilities of the relative position and the relative attitude, the estimation errors of the absolute position and the absolute attitude can be calculated as the reliabilities of the absolute position and the absolute attitude, and more reliable position and attitude can be determined as the position and the attitude of the vehicle 1.

Fourth Modification of First Embodiment

Figure 24:
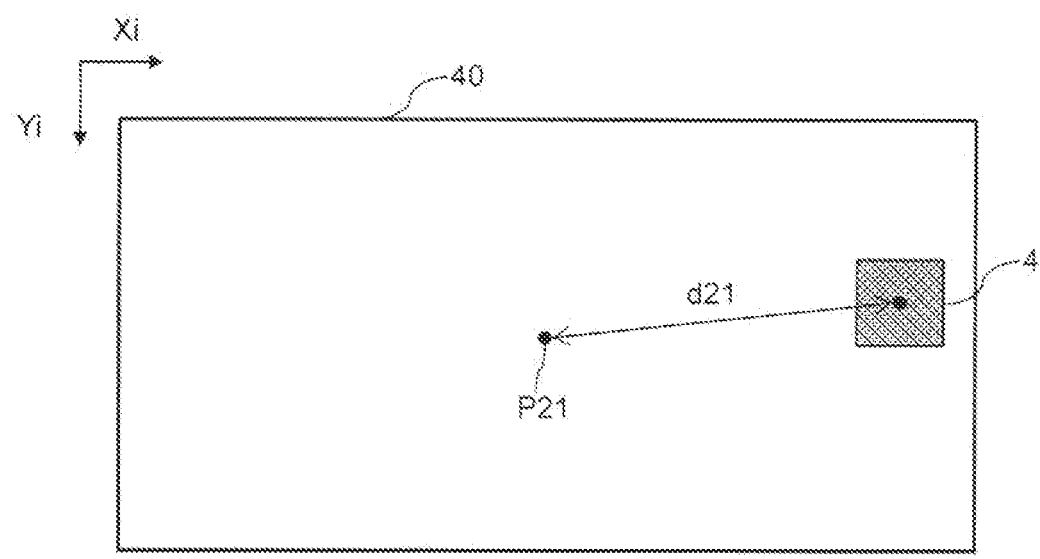
FIG. 24 is a diagram for explaining calculation of reliabilities of the absolute position and the absolute attitude in positioning process according to a fourth modification of the first embodiment.

FIG. 24 is a diagram for explaining calculation of the reliabilities of the absolute position and the absolute attitude in positioning process according to a fourth modification of the first embodiment. The reliability calculator 36 may consider the position of the marker 4 in the image captured by the image capturing apparatus 11, when calculating the estimation errors of the absolute position and the absolute attitude as described with reference to FIGS. 15 to 17.

Referring to FIG. 24, in an image 40 captured by the image capturing apparatus 11, the marker 4 is at a position at a distance d21 from a center P21 of the image 40. In the image 40 captured by the image capturing apparatus 11, the reliability calculator 36 calculates the reliabilities of the absolute position and the absolute attitude, such that the reliabilities increase as the distance d21 on from the center P21 of the image 40 to the marker 4 decreases, and such that the reliabilities decrease as the distance d21 increases. In this case, the reliabilities of the absolute position and the absolute attitude are represented by, for example, values obtained by multiplying the estimation errors of the absolute position and the absolute attitude, which are calculated in a manner similar to that of the case described with reference to FIGS. 15 to 17, by a coefficient including the distance d21 from the center P21 of the image 40 to the marker 4.

An estimation error E2a' of the absolute position and an estimation error E2b' of the absolute attitude in consideration of the position of the marker 4 in the image are expressed as follows.

$$E2a' = \lambda \times d21 \times E2a$$

$$E2b' = \lambda \times d21 \times E2b$$

$\lambda$ is a predetermined constant. The estimation error E2a of the absolute position and the estimation error E2b of the absolute attitude are calculated in a manner similar to that of the case described with reference to FIGS. 15 to 17.

The reliabilities of the relative position and the relative attitude are calculated in a manner similar to that of the case described with reference to FIGS. 11 and 18 to 23.

Depending on the position of the marker 4 in the image captured by the image capturing apparatus 11, it may be difficult to distinguish the markers 4 having surfaces at different angles with respect to the optical axis of the image capturing apparatus 11. For example, at edges of the image captured by the image capturing apparatus, it is difficult to distinguish between the marker 4 having a surface perpendicular to the optical axis of the image capturing apparatus 11, and the marker 4 having a surface parallel to the optical axis of the image capturing apparatus 11.

Figure 25:
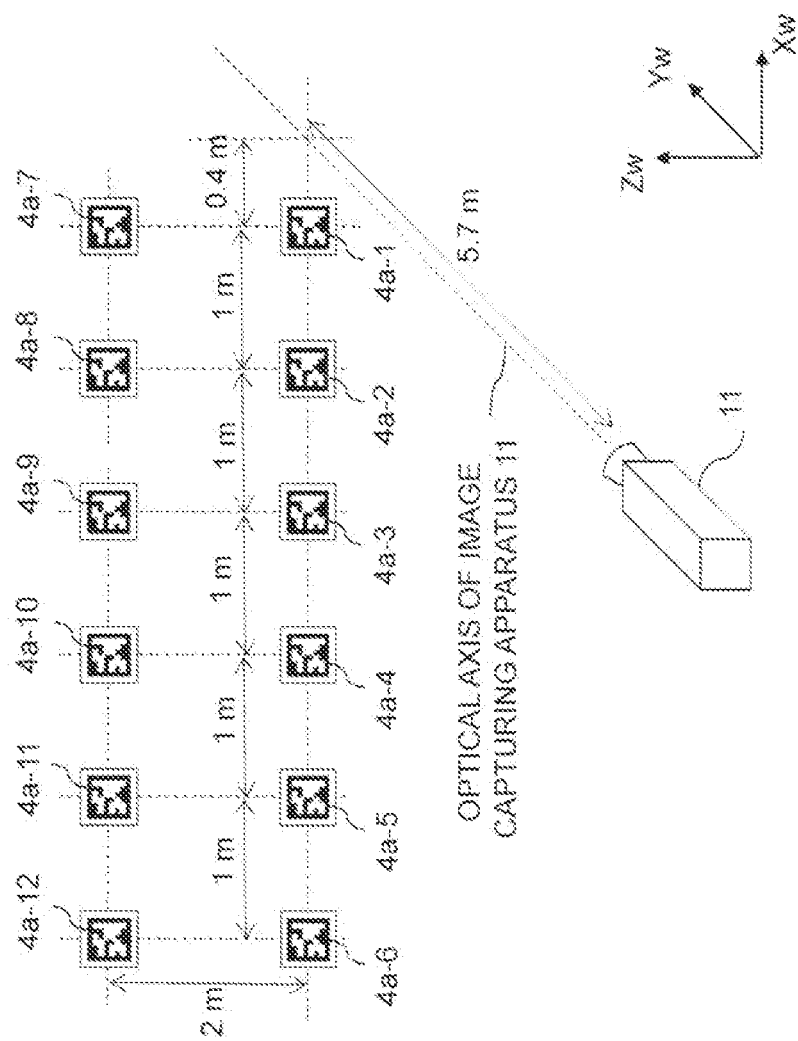
FIG. 25 is a diagram showing an exemplary arrangement of markers 4a-1 to 4a-12 to be captured by the image capturing apparatus 11 of FIG. 1.
Figure 26:
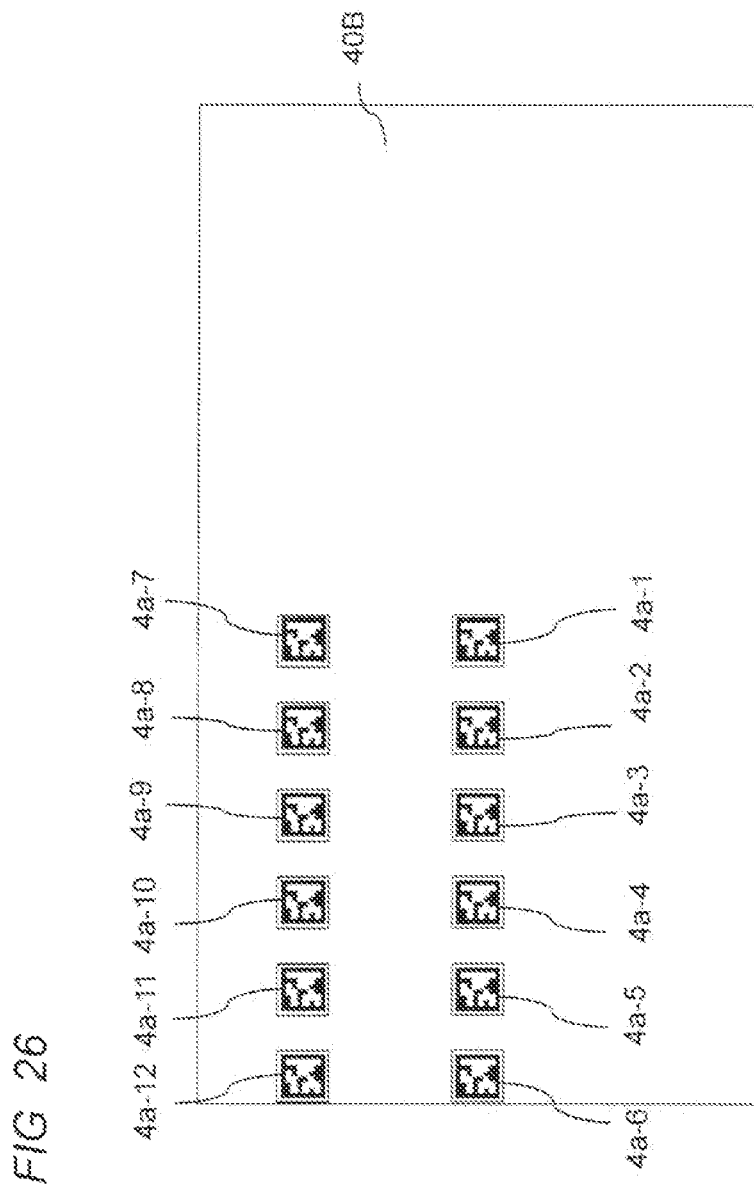
FIG. 26 is a diagram showing an example of an image 40 of the markers 4a-1 to 4a-12 of FIG. 25 captured by the image capturing apparatus 11.

FIG. 25 is a diagram showing exemplary arrangement of markers 4a-1 to 4a-12 to be captured by the image capturing apparatus 11 of FIG. 1. Each of the markers 4a-1 to 4a-12 has a square shape of 0.6 m×0.6 m. Further, the markers 4a-1 to 4a-12 are arranged such that their surfaces are perpendicular to the optical axis of the image capturing apparatus 11, that is, parallel to the Xw-Zw plane. FIG. 26 is a diagram showing an example of an image 40 of the markers 4a-1 to 4a-12 of FIG. 25 captured by the image capturing apparatus 11.

Figure 27:
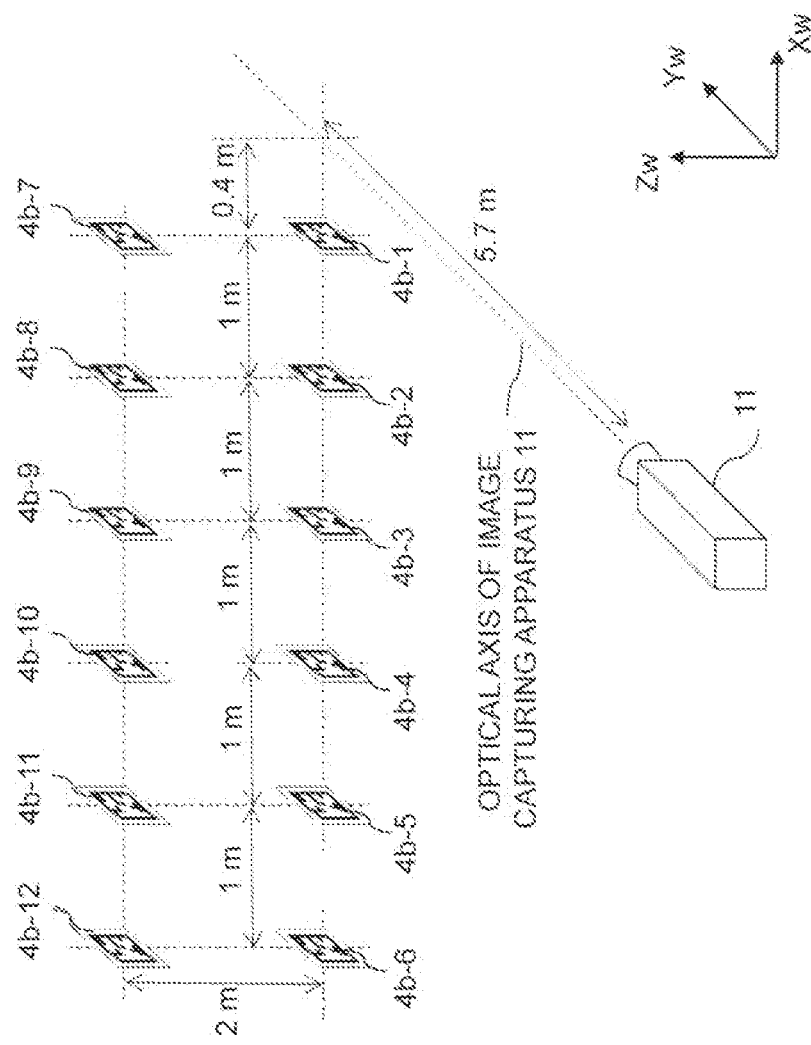
FIG. 27 is a diagram showing an exemplary arrangement of markers 4b-1 to 4b-12 to be captured by the image capturing apparatus 11 of FIG. 1.
Figure 28:
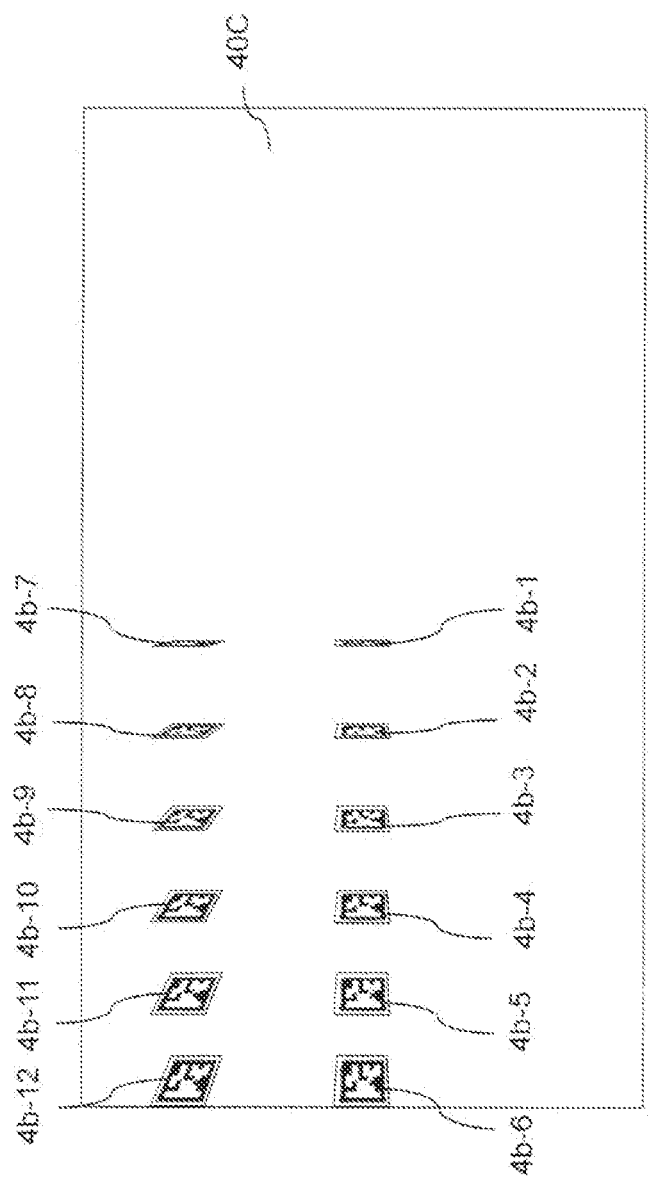
FIG. 28 is a diagram showing an example of an image 40 of the markers 4b-1 to 4b-12 of FIG. 27 captured by the image capturing apparatus 11.

FIG. 27 is a diagram showing exemplary arrangement of markers 4b-1 to 4b-12 to be captured by the image capturing apparatus 11 of FIG. 1. Each of the markers 4b-1 to 4b-12 has a square shape of 0.6 m×0.6 m. Further, the markers 4b-1 to 4b-12 are arranged such that their surfaces are parallel to the optical axis of the image capturing apparatus 11, that is, parallel to the Yw-Zw plane. FIG. 28 is a diagram showing an example of an image 40 of the markers 4b-1 to 4b-12 of FIG. 27 captured by the image capturing apparatus 11. Comparing FIG. 28 with FIG. 26, it can be seen that the marker 4b-6 of FIG. 28 looks almost the same size and shape as each of the markers 4a-1 to 4a-12 of FIG. 26, even though the orientation of the surface is different by 90 degrees.

Figure 29:
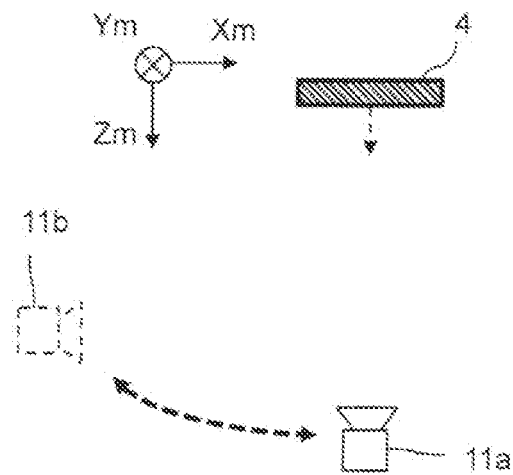
FIG. 29 is a diagram explaining a change in position of the image capturing apparatus 11 of FIG. 1 in the marker coordinate system, the change being caused by erroneous detection of an angle of a surface of the marker 4 with respect to an optical axis of the image capturing apparatus 11.

FIG. 29 is a diagram explaining a change in position of the image capturing apparatus 11 of FIG. 1 in the marker coordinate system, the change being caused by erroneous detection of an angle of a surface of the marker 4 with respect to an optical axis of the image capturing apparatus 11. As described above, the markers 4a-1 to 4a-12 of FIG. 26 and the marker 4b-6 of FIG. 28 are apparently not distinguishable from each other. Therefore, although the image capturing apparatus 11 should have the position and attitude of "11a" in the marker coordinate system of FIG. 29, it may be erroneously determined to have the position and attitude of "11b", and vice versa. In a case where the optical axis of the image capturing apparatus 11 passes through a substantial center of the surface of the marker 4, and is substantially perpendicular to the surface of the marker 4, it is difficult to determine the position of the image capturing apparatus 11 in the marker coordinate system with an origin at the marker 4, and such a marker 4 is not suitable to calculate the absolute position and the absolute attitude of the vehicle 1. Therefore, it is considered that the markers 4 having a surface perpendicular to the optical axis of the image capturing apparatus 11 (markers 4-1 to 4a-12 of FIG. 25), and the marker 4 that appears to have a surface perpendicular to the optical axis of the image capturing apparatus 11 (marker 4b-6 of FIG. 27) are not reliable. The reliability calculator 36 increases the estimation errors of the absolute positions and the absolute attitudes of such markers 4.

As the distance d21 from the center P21 of the image 40 to the marker 4 increases (that is, as the marker 4 approaches an edge in the image 40), the estimation errors of the absolute position and the absolute attitude increase (that is, the reliabilities of the absolute position and the absolute attitude decrease). In addition, as the distance d21 decreases (that is, as the marker 4 approaches the center P21 in the image 40), the estimation errors of the absolute position and the absolute attitude decrease (that is, the reliabilities of the absolute position and the absolute attitude increase). Therefore, the reliabilities of the absolute position and the absolute attitude can be expressed using the estimation errors of the absolute position and the absolute attitude in consideration of the position of the marker 4 in the image.

According to the modification of FIG. 24, it is possible to more accurately measure the position and the attitude of the vehicle 1, by considering the position of the marker 4 in the image captured by the image capturing apparatus 11.

Fifth Modification of First Embodiment

Figure 30:
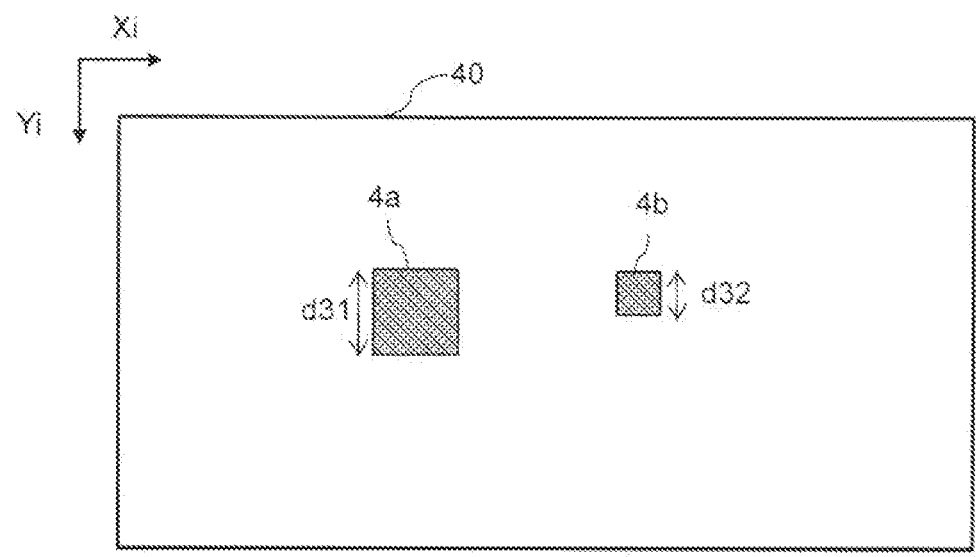
FIG. 30 is a diagram for explaining calculation of reliabilities of the absolute position and the absolute attitude in positioning process according to a fifth modification of the first embodiment.

FIG. 30 is a diagram for explaining calculation of the reliabilities of the absolute position and the absolute attitude in positioning process according to a fifth modification of the first embodiment. The reliability calculator 36 may consider the apparent size of the marker 4 in the image captured by the image capturing apparatus 11.

The reliability calculator 36 may calculate the reliabilities of the absolute position and the absolute attitude such that the reliabilities increase as the apparent size of the marker 4 in the image captured by the image capturing apparatus 11 increases, and such that the reliabilities decrease as the apparent size of the marker 4 in the image decreases. In this case, the reliabilities of the absolute position and the absolute attitude are represented by, for example, values obtained by multiplying the estimation errors of the absolute position and the absolute attitude, which are calculated in a manner similar to that of the case described with reference to FIGS. 15 to 17 and FIGS. 24 to 29, by a coefficient indicating the apparent size of the marker 4 in the image.

Referring to FIG. 30, in the image 40 captured by the image capturing apparatus 11, the marker 4a has an apparent size d31, and the marker 4b has an apparent size d32. The apparent sizes of the markers 4a and 4b in the image are represented by, for example, height direction (the number of pixels). The apparent size of the marker 4 in the image corresponds to the distance from the image capturing apparatus 11 to the marker 4.

The estimation error E2a of the absolute position and the estimation error E2b of the absolute attitude are calculated in a manner similar to that of the case described with reference to FIGS. 15 to 17 and FIGS. 24 to 29.

The reliabilities of the relative position and the relative attitude are calculated in a manner similar to that of the case described with reference to FIGS. 11 and 18 to 23.

As the apparent size of the marker 4 in the image decreases (that is, as the distance from the image capturing apparatus 11 to the marker 4 increases), the estimation errors of the absolute position and the absolute attitude increase (that is, the reliabilities of the absolute position and the absolute attitude decrease). In addition, as the apparent size of the marker 4 in the image increases (that is, as the distance from the image capturing apparatus 11 to the marker 4 decreases), the estimation errors of the absolute position and the absolute attitude decrease (that is, the reliabilities of the absolute position and the absolute attitude increase). Therefore, the reliabilities of the absolute position and the absolute attitude can be expressed using the estimation errors of the absolute position and the absolute attitude in consideration of the apparent size of the marker 4 in the image.

Additionally or alternatively, the position and attitude determiner 37 may determine the relative position and the relative attitude as the position and the attitude of the vehicle 1, whenever the apparent size of the marker 4 in the image captured by the image capturing apparatus 11 is smaller than a predetermined threshold. In other words, when the apparent size of the marker 4 in the image is smaller than the threshold, the reliabilities of the absolute position and the absolute attitude is minimized. The threshold of the apparent size of the marker 4 in the image is set to 7 pixels in height direction, for example.

According to the modification of FIG. 30, it is possible to more accurately measure the position and the attitude of the vehicle 1, by considering the apparent size of the marker 4 in the image captured by the image capturing apparatus 11.

Modified Embodiment of First Embodiment

The image capturing apparatus 11 may be configured to generate an image of an object, and also detect distances from the image capturing apparatus 11 to points of the object. The image capturing apparatus 11 may include a depth sensor, such as an RGB-D camera, or a Time of Flight (ToF) sensor, in order to detect a distance to the object. Alternatively, the image capturing apparatus 11 may be a stereo camera including two cameras disposed apart from each other by a certain distance, in order to detect a distance to the object.

When the image capturing apparatus 11 detects the distance, the relative position calculator 32 may calculate the relative position and the relative attitude of the vehicle 1 using a well-known iterative closest point (ICP) algorithm or the like.

While the relative position calculation process of FIG. 9 using FAST and KLT trackers is described by way of example, other methods may be used. For example, feature point detection, feature point matching, or the like, using Scale Invariant Feature Transform (SIFT) or Oriented FAST and Rotated BRIEF (ORB), which are typically used for image processing, may be used.

When the marker 4 is disposed at the middle of the straight section of the passageway 101, it is expected that the absolute position and the absolute attitude can be calculated accurately. On the other hand, when the marker 4 is disposed near an intersection of the passageways 101, or near an entrance and exit of the passageways 101, the vehicle 1 does not always go straightforward near the marker 4, and therefore, errors may increase in the absolute position and the absolute attitude calculated. Therefore, some of the plurality of markers 4 may be provided as an auxiliary marker not used for calculating the absolute position and the absolute attitude (i.e., for correcting the position and the attitude). The auxiliary marker is disposed near, for example, origination or destination of the vehicle 1, or certain structures which may be other checkpoints (an entrance and exit of the warehouse 100, an intersection of the passageways 101, a specific one of the shelves 102, and the like). The auxiliary marker need not be disposed along the passageway 101, as long as the auxiliary marker can be captured from the vehicle 1. The positioning apparatus 12 can recognize that the vehicle 1 has arrived at a specific checkpoint, by detecting the auxiliary marker. In this case, a marker information table stored in the storage apparatus 35 further includes an item indicating whether or not each of the markers 4 is an auxiliary marker. In addition, in this case, the marker information table may not include information on the position and the attitude of the auxiliary marker. In addition, the marker information table may include an item indicating reliability of the absolute position and the absolute attitude calculated based on each of the markers 4, instead of the item indicating whether or not the marker 4 is an auxiliary marker.

The vehicle 1 and the server apparatus 2 may use a removable storage medium, such as an SD card, instead of the communication apparatuses 13 and 22. The position and the attitude of the vehicle calculated at the vehicle may be written into the storage medium, and the server apparatus 2 may read out the position and the attitude of the vehicle from the storage medium.

The vehicle 1 may be a manned vehicle, such as a truck or tractor, instead of a forklift. The vehicle 1 may be an unmanned cargo carrying apparatus, such as an automated guided vehicle (AGV) and a pallet transport robot. In this case, the vehicle 1 travels by controlling the drive mechanism 15 under control of the server apparatus 2. In addition, the vehicle 1 may be a human-powered vehicle without a drive mechanism, such as a dolly.

The positioning apparatus 12 may be provided in the server apparatus 2, instead in the vehicle 1. In this case, the image captured by the image capturing apparatus 11 is transmitted from the vehicle 1 to the server apparatus 2 by the communication apparatus 13 (or through a removable storage medium). The positioning apparatus 12 of the server apparatus 2 calculates the position and the attitude of the vehicle 1 based on the images obtained from the vehicle 1, in a manner similar to that of the positioning apparatus 12 of FIG. 2.

Advantageous Effects, Etc. of First Embodiment

According to the first embodiment, a positioning device is provided with: a relative position calculator 32, a storage apparatus 35, an absolute position calculator 34, a reliability calculator 36, and a position and attitude determiner 37. The relative position calculator 32 is configured to calculate a relative position and a relative attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 is configured to store information on identifiers, positions, and attitudes of a plurality of markers 4 disposed at predetermined positions and visually distinguishable from each other, and information on a map containing a passageway for the vehicle 1. The absolute position calculator 34 is configured to extract one of the plurality of markers 4 from an image captured by the image capturing apparatus 11, and calculate an absolute position and an absolute attitude of the vehicle 1 indicating a position and an attitude of the vehicle 1 in the map, based on a position and an attitude of the one extracted marker 4. The reliability calculator 36 is configured to calculate first reliability indicating reliabilities of the relative position and the relative attitude calculated by the relative position calculator 32, and a second reliability indicating reliabilities of the absolute position and the absolute attitude calculated by the absolute position calculator 34. The position and attitude determiner 37 is configured to determine the relative position and the relative attitude as a position and an attitude of the vehicle 1 when the first reliability is equal to or larger than the second reliability, and determine the absolute position and the absolute attitude as the position and the attitude of the vehicle 1 when the first reliability is smaller than the second reliability.

With this configuration, it is possible to accurately measure the position and the attitude of the vehicle 1, by calculating the reliabilities of the relative position and the relative attitude, and the reliabilities of the absolute position and the absolute attitude, and determining more reliable position and attitude as the position and the attitude of the vehicle 1.

According to the first embodiment, the reliability calculator 36 may be configured to calculate the first reliability such that the first reliability increases as a moving distance and a rotation angle of the vehicle 1 from a reference position and a reference attitude decrease. The reliability calculator 36 is configured to reset the reference position and the reference attitude when the position and attitude determiner 37 determines the absolute position and the absolute attitude as the position and attitude of the vehicle 1.

With this configuration, it is possible to calculate errors of the relative position and the relative attitude based on the moving distance and the rotation angle of the vehicle 1.

According to the first embodiment, the reliability calculator 36 may be configured to calculate the first reliability such that the first reliability increases as a difference between the relative position and the absolute position decreases, and as a difference between the relative attitude and the absolute attitude decreases.

With this configuration, it is possible to calculate errors of the relative position and the relative attitude based on the difference between the relative position and the absolute position decreases, and the difference between the relative attitude and the absolute attitude decreases.

According to the first embodiment, the relative position calculator 32 may be configured to calculate the relative position and the relative attitude based on feature points tracked in a plurality of temporally adjacent images. The reliability calculator 36 may be configured to calculate a reliability of tracking based on the number of feature points that are successfully tracked in the plurality of temporally adjacent images, and calculate the first reliability such that the first reliability increases as the reliability of tracking increases.

With this configuration, it is possible to calculate errors of the relative position and the relative attitude based on the reliability of tracking.

According to the first embodiment, the reliability calculator 36 may be configured to calculate the first reliability such that the first reliability increases as a variance of an amount of change of the relative position or the relative attitude decreases.

With this configuration, it is possible to calculate errors of the relative position and the relative attitude based on the variance of the amount of change of the relative position or the relative attitude decreases.

According to the first embodiment, the reliability calculator 36 may be configured to calculate the second reliability such that the second reliability increases as a distance on an image captured by the image capturing apparatus 11 from a center of the image to the marker 4 decreases.

With this configuration, it is possible to calculate errors of the absolute position and the absolute attitude based on the position of the marker in the image captured by the image capturing apparatus 11.

According to the first embodiment, the reliability calculator 36 may be configured to calculate the second reliability such that the second reliability increases as an apparent size of the marker 4 in the image captured by the image capturing apparatus 11 increases.

With this configuration, it is possible to calculate errors of the absolute position and the absolute attitude based on the apparent size of the marker 4 in the image captured by the image capturing apparatus 11.

According to the first embodiment, the position and attitude determiner 37 may be configured to determine the relative position and the relative attitude as the position and the attitude of the vehicle 1, when an apparent size of the marker 4 in the image captured by the image capturing apparatus 11 is smaller than a predetermined threshold.

With this configuration, it is possible to calculate errors of the absolute position and the absolute attitude in consideration of the apparent size of the marker 4 in the image captured by the image capturing apparatus 11.

Second Embodiment

Figure 31:
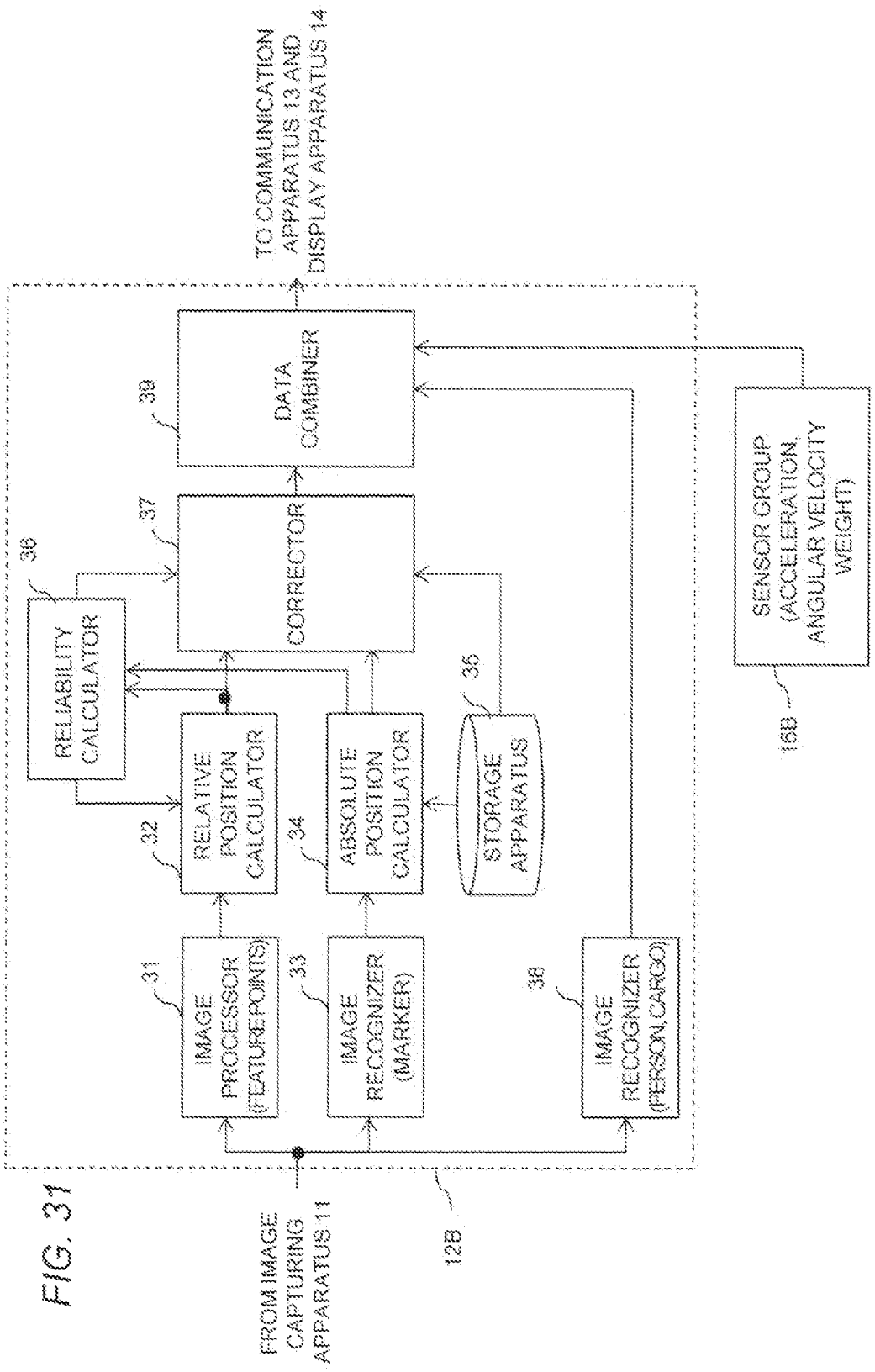
FIG. 31 is a block diagram showing a configuration of a positioning apparatus 128 according to a second embodiment.

With reference to FIG. 31, a positioning apparatus according to a second embodiment, and a moving body provided with such a positioning apparatus will be described.

Configuration of Second Embodiment

FIG. 31 is a block diagram showing a configuration of a positioning apparatus 12B according to a second embodiment. The vehicle 1 according to the first embodiment may be provided with a positioning apparatus 12B, instead of the positioning apparatus 12 of FIG. 3. The positioning apparatus 12B is provided with an image recognizer 38 and a data combiner 39, in addition to the components of the positioning apparatus 12 of FIG. 3.

The image recognizer 38 recognizes a predetermined target object from an image captured by the image capturing apparatus 11. The image recognizer 38 may recognize a person (for example, a driver of the vehicle 1, or a person around the vehicle 1). The image recognizer 38 may recognize specific cargo 3 learned in advance. The image processor 31, the image recognizer 33, and the image recognizer 38 may obtain images from the same image capturing apparatus 11. Alternatively, the image recognizer 38 may capture an image including a person and/or the cargo 3, using an image capturing apparatus different from the image capturing apparatus 11 for capturing images to be supplied to the image processor 31 and the image recognizer 33 (i.e., images for measuring the position and the attitude of the vehicle 1). In this case, the image capturing apparatus 11 may be provided, for example, so as to capture images of the passageway 101 in front of the vehicle 1, while the other image capturing apparatus may be provided, for example, so as to capture a driver's seat or a cargo carrier of the vehicle 1. The image capturing apparatus 11 and the other image capturing apparatus are synchronized with each other in advance.

The data combiner 39 obtains data of the position and the attitude of the vehicle 1 determined by the position and attitude determiner 37, from the position and attitude determiner 37, together with a timestamp indicating a time moment at which an image corresponding to the position and the attitude is captured by the image capturing apparatus 11 (or a time moment at which the position and the attitude are calculated). The data combiner 39 combines image recognition data of the target object recognized by the image recognizer 38, with the data of the position and the attitude of the vehicle 1. In addition, the data combiner 39 obtains sensor data generated by a sensor group 16B including one or more sensors mounted on the vehicle 1, and combines the sensor data with the data of the position and the attitude of the vehicle 1. The data combiner 39 may obtains sensor data including at least one of an acceleration and an angular velocity of the vehicle 1. In addition, the data combiner 39 may also obtain sensor data including a weight of the cargo 3 carried by the vehicle 1. Sensors of the sensor group 16B provide sensor data with a timestamp indicating a time moment when the sensor data is obtained. The data combiner 39 combines these data in synchronization with each other, based on the timestamp of the data of the position and the attitude of the vehicle 1, the timestamp of the image recognition data, and the timestamp of the sensor data.

When the timestamps of these data differ from each other, the data combiner 39 may associate the image recognition data or the sensor data, with the position and attitude data of the vehicle 1 having a timestamp closest to that of the image recognition data or the sensor data. In addition, when the timestamps of these data differ from each other, the data combiner 39 may interpolate the data of the position and the attitude of the vehicle 1 using linear interpolation, internal division, or the like, and associate the image recognition data or the sensor data, with the position data and the attitude data of the vehicle 1 interpolated and having a timestamp corresponding to the image recognition data or the sensor data.

Since the data combiner 39 is provided, it is possible to record various data associated with work of the vehicle 1 in association with the position and the trajectory of the vehicle 1. For example, a person associated with the work of the vehicle 1 can be tracked by recording a person recognized by image recognition. The cargo 3 carried by the vehicle 1 can be tracked by recording the cargo 3 recognized by image recognition. A rough road surface of a warehouse or the like can be detected by recording the acceleration and the angular velocity of the vehicle 1. A workload of the vehicle 1 can be monitored by recording a weight of the cargo 3.

Advantageous Effects, Etc. of Second Embodiment

According to the second embodiment, the data combiner 39 may be further provided for obtaining sensor data generated by one or more sensors mounted on the vehicle 1, and combines sensor data with data of the position and the attitude determined by the position and attitude determiner 37.

According to the second embodiment, the data combiner 39 may obtain sensor data including at least one of an acceleration and an angular velocity of the vehicle 1.

According to the second embodiment, the data combiner 39 may obtain sensor data including a weight of the cargo 3 carried by the vehicle 1.

According to the second embodiment, the positioning apparatus 12B may be further provided with the image recognizer 38 that recognizes a predetermined target object from an image captured by the image capturing apparatus 11. In this case, the data combiner 39 combines information on the target object recognized by the image recognizer 38, with the data of the position and the attitude determined by the position and attitude determiner 37.

According to the second embodiment, the image recognizer 38 may recognize a person.

According to the second embodiment, the image recognizer 38 may recognize the specific cargo 3 learned in advance.

According to the second embodiment, various data associated with work of the vehicle 1 can be recorded in association with the position and the trajectory of the vehicle 1.

According to the second embodiment, the vehicle 1 may be provided with the image capturing apparatus 11 that captures images for measuring the position and the attitude of the vehicle 1, and a different image capturing apparatus that captures a further target object. In this case, the data combiner 39 can associate data of the position and the attitude data of the vehicle 1 generated based on images captured by the image capturing apparatus 11, with image recognition data generated based on the image captured by the further image capturing apparatus. When the data of the position and the attitude of the vehicle 1 is associated with the image recognition data of the different target object captured during movement of the vehicle 1, this association is considerably useful for work analysis performed based on the position and the trajectory of the vehicle 1 on the map. For example, when a person's suspicious activity is detected by visual inspection or the like, the person's position is determined on the map, and therefore, it is possible to search and retrieve an image or a video captured in the past in the vicinity of the person's position, and/or in association with the person.

Other Embodiments

In the respective embodiments, the positioning apparatus may be provided on a four-wheel vehicle, such as a forklift or a truck, or may be provided on vehicles with one to three, five or more wheel. In addition, in the respective embodiments, the positioning apparatus may be provided on a moving body without wheels, such as an airplane, a helicopter, a drone, and a hovercraft, regardless of the number of wheels and/or the presence/absence of wheels. The positioning apparatus according to the present embodiments can estimate a position of a moving body not based on a number of rotation of wheels, but based on an image captured by an image capturing apparatus.

According to the positioning apparatus of aspects of the present disclosure, it is possible to measure a position of a moving body in a warehouse, a factory, or the like. Accordingly, it is possible to track a trajectory (flow) of the moving body, route the moving body, optimize an arrangement of cargo or the like in a warehouse or a factory, monitor an operating rate, improving work efficiency, and the like are achievable.

The invention claimed is:

1. A positioning device comprising:
a circuit that calculates a first position and a first attitude of a moving body indicating a relative position and a relative attitude of the moving body with respect to a reference position and a reference attitude, based on a plurality of images captured by a camera mounted on the moving body;
wherein the circuit extracts a marker from an image captured by the camera, the marker being disposed at a predetermined position and visually distinguishable from other markers, and the circuit calculates a second position and a second attitude of the moving body indicating a position and an attitude of the moving body in a map containing a passageway for the moving body, based on a position and an attitude of the one extracted marker;
the circuit calculates first reliability indicating reliabilities of the first position and the first attitude calculated by the circuit, and a second reliability indicating reliabilities of the second position and the second attitude calculated by the circuit;
the circuit determines the first position and the first attitude as a position and an attitude of the moving body when the first reliability is equal to or larger than the second reliability, and determines the second position and the second attitude as the position and the attitude of the moving body when the first reliability is smaller than the second reliability;
the circuit calculates the first reliability such that the first reliability increases as a moving distance and a rotation angle of the moving body from a reference position and a reference attitude decrease; and
the circuit calculates the first reliability such that the first reliability increases as a difference between the first position and the second position decreases, and as a difference between the first attitude and the second attitude decreases.

2. The positioning device as claimed in claim 1,
wherein the circuit resets the reference position and the reference attitude when the circuit determines the second position and the second attitude as the position and attitude of the moving body.

3. The positioning device as claimed in claim 2,
wherein the circuit calculates the first position and the first attitude based on feature points tracked in a plurality of temporally adjacent images, and
calculates a reliability of tracking based on the number of feature points that are successfully tracked in the plurality of temporally adjacent images, and calculate the first reliability such that the first reliability increases as the reliability of tracking increases.

4. The positioning device as claimed in claim 1, wherein the circuit calculates the first reliability such that the first reliability increases as a variance of an amount of change of the first position or the first attitude decreases.

5. The positioning device as claimed in claim 1,
wherein the circuit calculates the second reliability such that the second reliability increases as a distance on an image captured by the camera from a center of the image to the marker decreases.

6. The positioning device as claimed in claim 1,
wherein the circuit calculates the second reliability such that the second reliability increases as an apparent size of the marker in the image captured by the camera increases.

7. The positioning device as claimed in claim 1,
wherein the circuit determines the first position and the first attitude as the position and the attitude of the moving body, when an apparent size of the marker in the image captured by the camera is smaller than a predetermined threshold.

8. The positioning device as claimed in claim 1, wherein the circuit obtains sensor data generated by one or more sensors mounted on the moving body, and combines data of the position and the attitude of the moving body determined by the circuit, with the sensor data.

9. The positioning apparatus as claimed in claim 8,
wherein the circuit obtains sensor data including at least one of an acceleration and an angular velocity of the moving body.

10. The positioning apparatus as claimed in claim 8,
wherein the circuit obtains sensor data including a weight of cargo carried by the moving body.

11. The positioning apparatus as claimed in claim 8,
wherein the circuit recognizes a predetermined target object from the image captured by the camera, and
combines data of the position and the attitude of the moving body determined by the circuit, with information on the target object recognized by the circuit.

12. The positioning apparatus as claimed in claim 11,
wherein the circuit recognizes a person.

13. The positioning apparatus as claimed in claim 11,
wherein the circuit recognizes specific cargo learned in advance.

14. A moving body comprising:
a camera; and
a positioning apparatus,
wherein the positioning apparatus comprises:
a circuit that calculates a first position and a first attitude of a moving body indicating a relative position and a relative attitude of the moving body with respect to a reference position and a reference attitude, based on a plurality of images captured by the camera mounted on the moving body;
wherein the circuit extracts a marker from an image captured by the camera, the marker being disposed at a predetermined position and visually distinguishable from other markers, and the circuit calculates a second position and a second attitude of the moving body indicating a position and an attitude of the moving body in a map containing a passageway for the moving body, based on a position and an attitude of the one extracted marker;
the circuit calculates first reliability indicating reliabilities of the first position and the first attitude calculated by the circuit, and a second reliability indicating reliabilities of the second position and the second attitude calculated by the circuit;
the circuit determines the first position and the first attitude as a position and an attitude of the moving body when the first reliability is equal to or larger than the second reliability, and determines the second position and the second attitude as the position and the attitude of the moving body when the first reliability is smaller than the second reliability;
the circuit calculates the first reliability such that the first reliability increases as a moving distance and a rotation angle of the moving body from a reference position and a reference attitude decrease the circuit calculates the first reliability such that the first reliability increases as a difference between the first position and the second position decreases, and as a difference between the first attitude and the second attitude decreases.

* * * * *